United States Patent
Eerenberg et al.

(10) Patent No.: US 6,621,979 B1
(45) Date of Patent: Sep. 16, 2003

(54) TRICK PLAY SIGNAL GENERATION FOR A DIGITAL VIDEO RECORDER USING RETRIEVED INTRA-ENCODED PICTURES AND GENERATED INTER-ENCODED PICTURES

(75) Inventors: Onno Eerenberg, Eindhoven (NL); Albert M. A. Rijckaert, Eindhoven (NL); Wilhelmus H. A. Brüls, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/329,394

(22) Filed: Jun. 10, 1999

(30) Foreign Application Priority Data

Jun. 11, 1998 (EP) .............................. 98201959

(51) Int. Cl.$^7$ ................................. H04N 5/91
(52) U.S. Cl. ............................ 386/68; 386/110; 386/81
(58) Field of Search ................ 386/125–126, 386/68, 81, 82, 109, 110, 111, 112, 124; H04N 5/91

(56) References Cited

U.S. PATENT DOCUMENTS

| | | | |
|---|---|---|---|
| 5,245,428 A | | 9/1993 | De With et al. ............ 358/133 |
| 5,867,625 A | * | 2/1999 | McLaren ..................... 386/68 |
| 6,222,981 B1 | | 4/2001 | Rijckaert .................... 386/68 |
| 6,418,269 B1 | | 7/2002 | Rijckaert .................... 386/68 |

FOREIGN PATENT DOCUMENTS

WO 9613121 5/1996 ............ H04N/5/76

\* cited by examiner

Primary Examiner—Vincent Boccio
(74) Attorney, Agent, or Firm—Edward W. Goodman

(57) ABSTRACT

A trick play information stream is generated from a normal play information stream, so that they can be recorded together as a composite information stream on the record carrier, such that upon reproduction in a trick play reproduction mode, an information signal of sufficient quality, e.g., as regards visibility, can be obtained. GOPs are generated, each GOP including an I-frame retrieved from the original normal play information stream, and one or more so-called 'empty P frames'. Another aspect is the requirement of generating GOPs for the trick play information stream that have a constant bitcost per GOP. Again, another aspect lies in the retrieval of the I-frame for the trick play information stream from the normal play information. More specifically, an I-frame is generated by retrieving, from an I-frame included in the normal play information, the DC coefficient of the I-frame and a number of AC coefficients from that I frame, and generating the I-frame for the trick play information stream therefrom. More specifically, the number of AC coefficients for an I-frame of the trick play information signal depends on the difference between the DC coefficients of two subsequent I-frames in the normal play information from which the I-frame to be generated and the just previously generated I-frame for the trick play information signal have been derived.

13 Claims, 14 Drawing Sheets

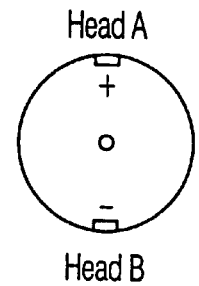
FIG. 1a
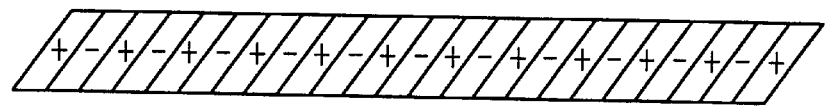
FIG. 1b
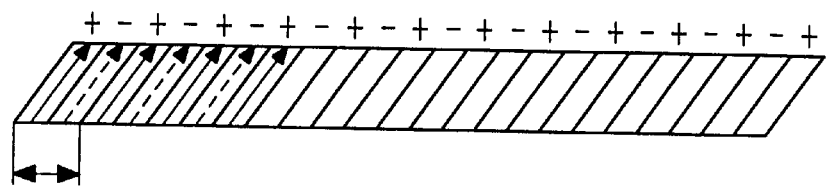
One revolution of the scanner    FIG. 2a
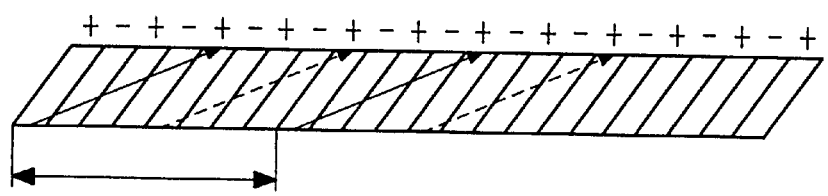
One revolution of the scanner
Scan path head A  ———▶
Scan path head B  -----▶    FIG. 2b Area 1: Slice bit cost assignment too low
Area 2: Slice bit cost assignment too high

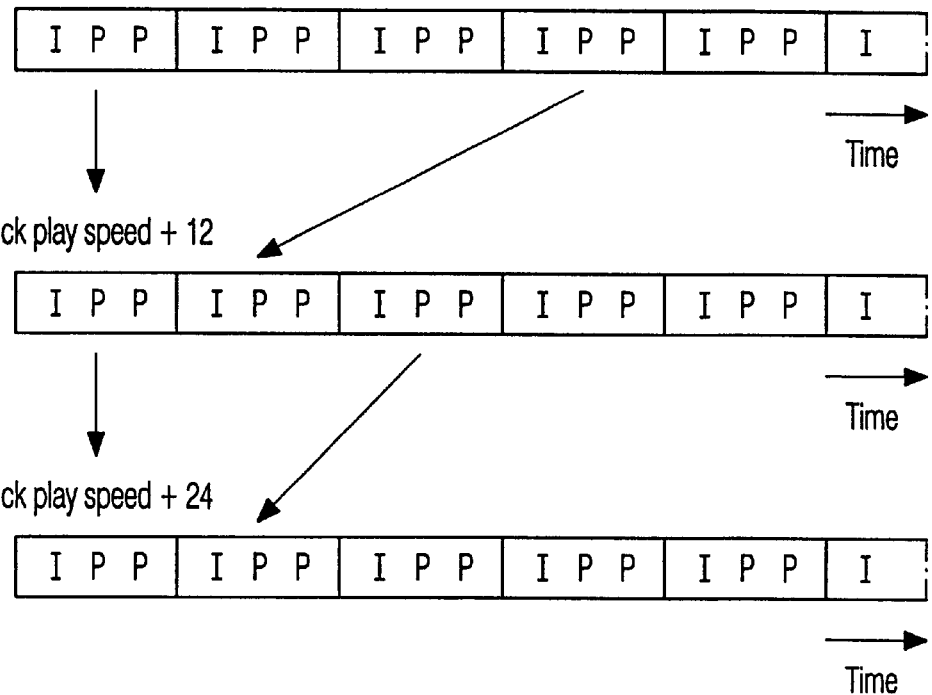
FIG. 12
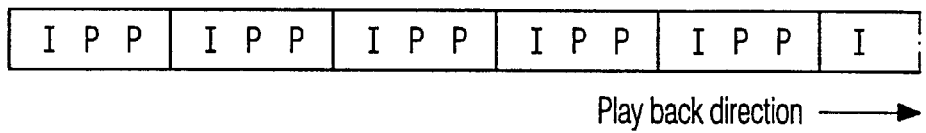
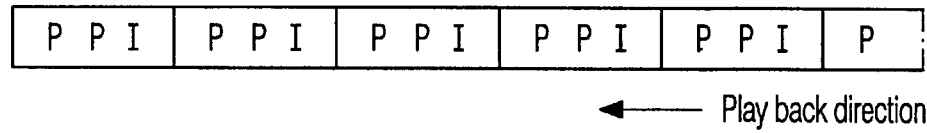
FIG. 13

| | | | | | |
|---|---|---|---|---|---|
| PAT | a | Main TS header | Adaptation field | PAT payload | Stuffing |
| PMT | b | Main TS header | Adaptation field | PAT payload | Stuffing |
| PLUSI | c | Main TS header | Adaptation field | PES header | Video payload |
| DATA | d | Main TS header | Video payload | | |
| PCR | e | Main TS header | Adaptation field | Video payload | |
| DATA | f | Main TS header | Video payload | | |
| DATA | g | Main TS header | Adaptation field | Stuffing | Video payload |
| PLUSI | h | Main TS header | Adaptation field | PES header | Video payload |
| DATA | i | Main TS header | Video payload | | |
| DATA | j | Main TS header | Adaptation field | Stuffing | Video payload |
| PLUSI | k | Main TS header | Adaptation field | PES header | Video payload |
| DATA | l | Main TS header | Video payload | | |
| DATA | m | Main TS header | Adaptation field | Stuffing | Video payload |
| DUMMY | n | Main TS header | Stuffing | | |

FIG. 14

TRICK PLAY SIGNAL GENERATION FOR A DIGITAL VIDEO RECORDER USING RETRIEVED INTRA-ENCODED PICTURES AND GENERATED INTER-ENCODED PICTURES

BACKGROUND OF THE INVENTION

1. Field of the Invention

The invention relates to an apparatus for recording a digital video information signal and a corresponding trick play signal onto a record carrier, said digital video information signal being meant for a reproduction from said record carrier at a nominal play reproduction speed, said trick play signal being meant for a reproduction from said record carrier at a trick play speed m times said nominal reproduction speed, m being an integer larger than 1. The invention further relates to a method of recording such trick play signal and to a record carrier.

2. Description of the Related Art

An apparatus as defined in the opening paragraph is known from published International Patent Application WO 95/28061 (PHN 14832), which corresponds to U.S. Pat. No. 5,751,889.

Bit-rate reduction of digital television signals has been an area of interest for more than three decades. This has resulted in an ISO standard for the coded representation of video and associated audio data. The first MPEG publication dated April 1992, which resulted in the introduction of MPEG-1. This system was designed to reduce the bit-rate down to 1.5 Mbits/s. To increase the video quality and still use low bit-rates, MPEG-2 has been developed. This technology has been selected to be used in Digital Video Broadcasting (DVB). DVB has the potential to transmit studio quality video at an acceptable low bit-rate. This enables the customer to receive studio quality signals at his own place. In order to enable the customer to store a DVB program with studio quality, a digital video recorder is required. For two years, Digital Video (DV) recorders and digital camcorders have been available for the consumer market. Both systems make use of dedicated video bit-rate reduction technology which is not compatible with the compression technology that is used in MPEG-2. In order to store a selected DVB program and maintaining the high quality, a transparent recorder is required. Although a standard has been defined to store MPEG on a DV recorder, up to now, no equipment has been produced that support this standard. A popular consumer audio-visual storage device is the VHS-based video recorder. This system is capable of storing and retrieving analog audio-visual programs. To enable storage of digital television programs, a digital extension is currently developed to enable the consumer to store and retrieve DVB programs. The currently developed standard describes the record and playback aspect of this system. Not yet included in this standard is how to perform trick play. Trick play, based on the track select system for D-VHS MPEG-2 STD mode format, will be described herein.

Since June, 1996, a new standard has been released, D-VHS MPEG2 STD mode format. This digital version of the VHS recorder family is capable of recording DVB signals at up to 13.8 Mbits/s. The standard, as it is currently available, only describes the record- and playback process. Visual search, better know as trick play, has not yet been defined.

SUMMARY OF THE INVENTION

It is an object of the invention to provide proposals for realizing trick play in general, and more specifically, for realizing trick play for D-VHS MPEG2 STD mode format.

In accordance with the invention, the apparatus for recording a digital video information signal on a record carrier comprises:
- input means for receiving the digital video information signal,
- trick play signal generating means for generating a trick play signal from said digital video information signal, so as to enable a trick play reproduction at a speed m times the nominal reproduction speed, where m is an integer larger than 1,
- merging means for merging said digital video information signal and said trick play signal into a composite information signal,
- writing means for writing said composite information signal in a track on said record carrier, said trick play signal generating means being adapted to
    (a) retrieve intra-encoded pictures from said digital video information signal,
    (b) generate inter-encoded pictures,
    (c) merge said intra-encoded pictures and said inter-encoded pictures, so as to obtain a trick play signal comprising subsequent groups of pictures, comprising an intra-encoded picture, followed by a number n of said generated inter-encoded pictures, where n is an integer larger than 0, the generated inter-encoded pictures being such that, upon reproduction at said trick play speed, an inter-encoded picture following an intra-encoded picture results, upon decoding, in a repeated presentation of a picture obtained from decoding said intra-encoded picture.

The intra-encoded pictures could be in the form of intraframe-encoded pictures, or in the form of intrafield-encoded pictures. Further, inter-encoded pictures could be in the form of interframe-encoded pictures, or in the form of interfield-encoded pictures. In the following description, it will be assumed that the intra-encoded pictures are in the form of intraframe-encoded pictures and that the inter-encoded pictures are in the form of interframe-encoded pictures.

The invention is based on the following recognition. The generation of the trick play information signal is based on the retrieval of intraframe-encoded pictures, such as I-pictures in accordance with the MPEG format, from the normal play information signal. Simply using intraframe-encoded pictures (I-pictures) with an acceptable refresh rate in the trick play information signal is not possible, as the bandwidth available for the transmission of those intraframe-encoded pictures in the trick play information signal is too small. In order to overcome this, so-called 'empty' interframe-encoded pictures, such as 'empty' P-pictures, and/or 'empty' B pictures, are generated and the datastream of the trick play information signal is built up of GOPs, each GOP comprising an intraframe-encoded picture (I-picture) and one or more of those 'empty' interframe-encoded pictures' (e.g., empty P-pictures). Such 'empty' interframe-encoded pictures result, upon decoding in the repeated presentation of the intraframe-encoded picture that preceded the one or more 'empty' interframe-encoded pictures. As the 'empty' interframe-encoded pictures require a relatively low bit content, it has now become possible to realize a trick play information signal that realizes upon reproduction and subsequent decoding in a trick play reproduction mode in a reproduced video signal with pictures having a sufficient frame rate. Further, such a GOP structure (as an example, an IPP . . . GOP structure), a sufficient refresh rate can be obtained.

A further aspect of the invention is that GOPs are generated for the trick play information signal with a constant bit-cost. This has the advantage that a trick play GOP can be re-used for higher trick play video speeds.

Another aspect of the invention lies in the generation of the intraframe-encoded pictures for the trick play information signal from the information comprised in the normal play information signal. More specifically, an intraframe-encoded picture comprises a DC coefficient and a number of AC coefficients. The DC coefficients of the sub-pictures of an intraframe-encoded picture in the normal play information signal are retrieved therefrom and used in the trick play information signal as the DC coefficients of the corresponding sub-pictures of an intraframe-encoded picture in said trick play information signal. Further, from a sub-picture of the same intraframe-encoded picture of the normal play information signal, a restricted number of AC coefficients from that picture is retrieved to form the AC coefficients for the corresponding sub-picture of the intraframe-encoded picture in the trick play information signal to be generated. This results in a reduction of the number of bits in the intraframe-encoded picture generated, compared to the intraframe-encoded picture of the normal play information signal. The number of AC coefficients selected for a sub-picture of a specific intraframe-encoded picture of the trick play signal depends on the difference between two DC coefficients, those DC coefficients being the DC coefficient of the said sub-picture and the previous sub-picture of the specific intraframe-encoded picture in the trick play signal.

The signal processing aspects of low-end trick play will be described. Low-end trick play means a trick play signal processing algorithm that re-uses pre-encoded MPEG video material to create video trick play.

The video trick play signal processing in accordance with the invention results in a low hardware complexity. For the video trick play signal processing, a wide variety of architectures can be applied. For all these architectures, two main parameters can be used to control the final quality. The first parameter is the spatial resolution of the MPEG-encoded picture. The second parameter is the temporal refresh rate at which the viewer perceives the decoded pictures. The low-end video trick play signal processing algorithm, will be based on MPEG pre-encoded video information, as it is available in case of a DVB broadcast. Beside a wide variety of trick play signal processing algorithms, there is also some variety in the system used to implement trick play. The trick play system used in this report is based on track select.

BRIEF DESCRIPTION OF THE DRAWINGS

These and other aspects of the invention will be apparent from and elucidated further with reference to the embodiments described hereafter. In the drawings:

FIG. 1a shows a top view of a rotary scanner with two heads A and B, and FIG. 1b shows the tracks on tape with different azimuth;

FIGS. 2a and 2b depict the scan paths of the heads during reproduction, where FIG. 2a shows the scan path during normal play and FIG. 2b shows the scan path for trick play with speed equal to four times normal play;

FIG. 5a shows the pictures that form the normal play video in PCM format, FIG. 5b shows trick play with a speed of +4 on the PCM pictures, and FIG. 5c shows the pictures that form video trick play with a trick play speed of +4 times the normal play speed;

FIG. 6a shows the normal play video in MPEG format, FIG. 6b shows trick play with a speed of +4 on the MPEG pictures, and FIG. 6c shows the video trick play with a trick play speed of +4 times the normal play speed;

FIG. 7a shows the normal play video in MPEG format, FIG. 7b shows the trick play on MPEG pictures, and FIG. 7c shows the trick play video with speed is +4 times normal play speed;

FIG. 12 shows the extraction trick play information for higher video trick play speeds from the trick play signal for the +4 times trick play speed;

FIG. 13 shows the generation of the trick play information for a reverse trick play speed by swapping the GOP of the forward trick play speed;

FIG. 14 shows the GOP layout at transport stream level;

FIG. 17 shows a transport stream which has jitter on a PCR packet;

DESCRIPTION OF THE PREFERRED EMBODIMENTS

In the following figure description, the invention will be described in the form of an example where the intraframe-encoded pictures are in the form of I pictures as encoded in accordance with the MPEG encoding standard, and where the interframe encoded pictures are in the form of P pictures as encoded in accordance with the MPEG encoding standard.

The general principles of track select trick play will be first described. D-VHS, like its analog counterpart, is a helical scan recorder. This means that the information is written on tape by means of a scanner which is positioned at a angle with respect to the longitudinal direction of the tape. The D-VHS scanner used for the MPEG-2 STD mode has two heads A and B with different azimuth angles. FIG. 1a indicates the position of the two heads A and B positioned on a rotary scanner, and FIG. 1b shows the tracks with different azimuth angles on tape, obtained during recording, using the above head configuration.

During normal play reproduction, these two heads read information from tape in such a way, that head A read the tracks written with head A during recording. The same procedure is valid for head B. During trick play reproduction, the heads A and B have a different scan path with respect to the normal play situation. As a consequence, head A and head B cross tracks that have been written with a different azimuth angle and tracks that have been written with the right azimuth angle when compared to the azimuth angles of the heads themselves. FIGS. 2a and 2b depict the above described phenomenon, where FIG. 2a shows the scan path during normal play, and FIG. 2b shows the scan path for trick play with speed equal to four times normal play.

Track select trick play is based on the fact that head A and B cross pre-determined tracks. When such a system is realized, then it is possible to write information on tape in such a way that this data becomes visible during trick play. Consequence of this system is that this data can only be used for one trick play tape speed. For this reason, specific trick play areas are defined for different trick play speeds. A tape format which contains trick play areas that are defined to implement the trick play speeds +/−4, +/−12 and +/−24 times normal play speed is described in earlier filed patent applications of applicant, such as U.S. patent application Ser. No. 09/013,547, filed Jan. 26, 1998 (PHN 16211), which corresponds to International Patent Application IB 98/00088, and U.S. Pat. Nos. 6,222,981 and 6,418,269, corresponding to International Patent Application IB 98/00131 (PHN 16614). With the above defined trick play speeds, it can be concluded that the values m, p and q, as defined in the claims, equal 4, 3 and 2, in the present example.

Figure 3:
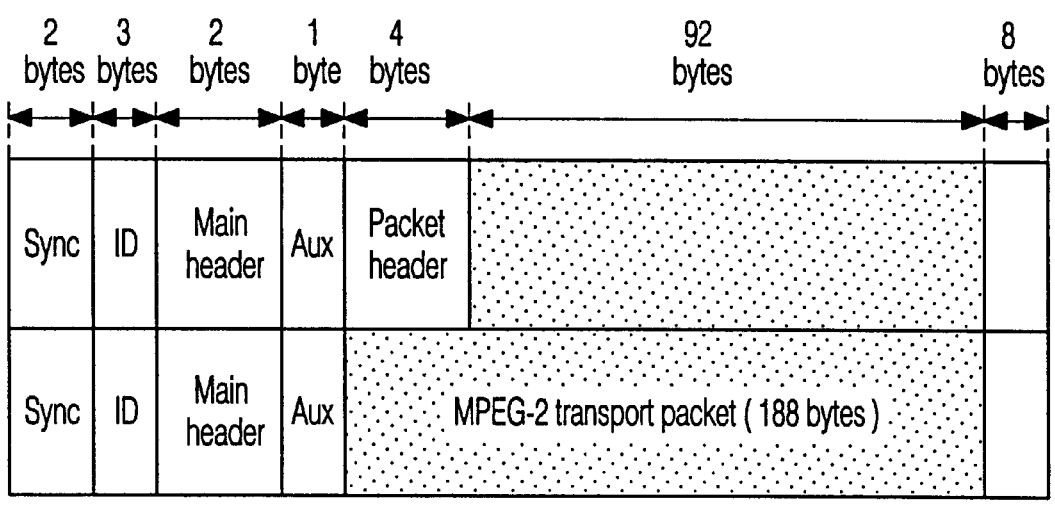
FIG. 3 shows the contents of two consecutive sync blocks.

The burst length of the trick play areas determines the amount of data that can be stored within these areas. The tape format, described in the above-mentioned patent applications, indicates that the amount of data, that is read during one revolution of the scanner, is equal for each trick play speed. The amount of data that will be retrieved, during one revolution of the scanner, from tape is 112 syncblocks, as described in IB 98/00131. Ten syncblocks will contain the outer parities of a second error correction layer, which leaves 102 syncblocks to carry payload. A syncblock is the smallest unit that is written to tape. It has a fixed length of 112 bytes. Two consecutive syncblocks will be used to store one transport stream packet, so 51 transport stream packets are stored per revolution. The 112 bytes are not only used to store payload, some of the bytes contains system information and other bytes contain inner parity bytes which are generated during record, and can be used by playback to correct erroneous syncblocks. A part of the system information is necessary to distinguish between normal play syncblocks, dummy syncblocks (stuffing) and trick play syncblocks, whereby, even a distinction is made for the different trick play speeds. For each syncblock, this information is written in the main header. The first syncblock contains, beside the first part of a transport stream packet, also a timestamp value, the packet header. This is a four-byte field where information is stored which is necessary for the playback side of the system in order to reconstruct the original timing of the successive transport stream packets. FIG. 3 shows the two consecutive syncblocks that carry one transport stream packet.

From the amount of payload syncblocks that are read per revolution, the channel bit-rate can be calculated. D-VHS MPEG-2 STD mode supports two scanner revolutions. The first scanner revolution is 30 Hz, the second scanner revolution is 30*(1000/1001)=29.97 Hz. For both situations, the channel bit-rate has been calculated and is available in Table 1.

TABLE 1

CHANNEL BIT-RATE FOR 30 HZ AND 29.97 HZ DRUM FREQUENCY

| Scanner revolution | Trick play channel bit-rate (bits/s) |
|---|---|
| 30 Hz | 2301120 |
| 29.97 Hz | 2298821.17 |

The bit-rates from Table 1 are the maximum bit-rates that can be used to generate a video trick play stream at transport stream level.

The MPEG compressed video trick play information will be embedded in a transport stream which must fit in the trick play bandwidth as calculated above. In order to generate video trick play information based on the normal play video information, the pictures must be extracted from the normal play video stream. The description below will deal with the different processing steps required to generate trick play information from a received DVB stream. The two main processing steps are:

Transport stream demultiplexing
Video elementary stream processing

The multiplex operation, which converts the video elementary stream back to a transport stream, will be discussed below. The reason for this is that the transport layer only consumes a part of the bit-rate, and does not add anything to the video quality. At this point, the main focus will be put on how to obtain the best performance with respect to the spatial resolution and the temporal refresh rate.

Audio-visual information that is broadcasted by DVB, makes use of a transport stream layer. This layer is configured in such a way that packets, with a fixed length of 188 bytes, carry, beside audio visual information, also data like videotext and Program Specific Information (PSI) from the provider to the end-user. For the transmission, three standards have been defined:

DVB-S
DVB-C
DVB-T the extensions S, C and T stand for Satellite, Cable and Terrestrial, respectively. Each transmission layer is optimized to conform to its own channel. At the decoder side, the output of the channel decoder is a transport stream. Normally, this transport stream carries N programs. After selecting one or more programs, which selection is necessary because the recording channel rate is lower than the transmission channel rate of the transport stream, a recording operation is possible. In order to generate video trick play information based on the recorded program, special signal processing is required. The first step is to extract the video elementary stream out of the transport stream multiplex. This operation is done by the demultiplexer.

Figure 4:
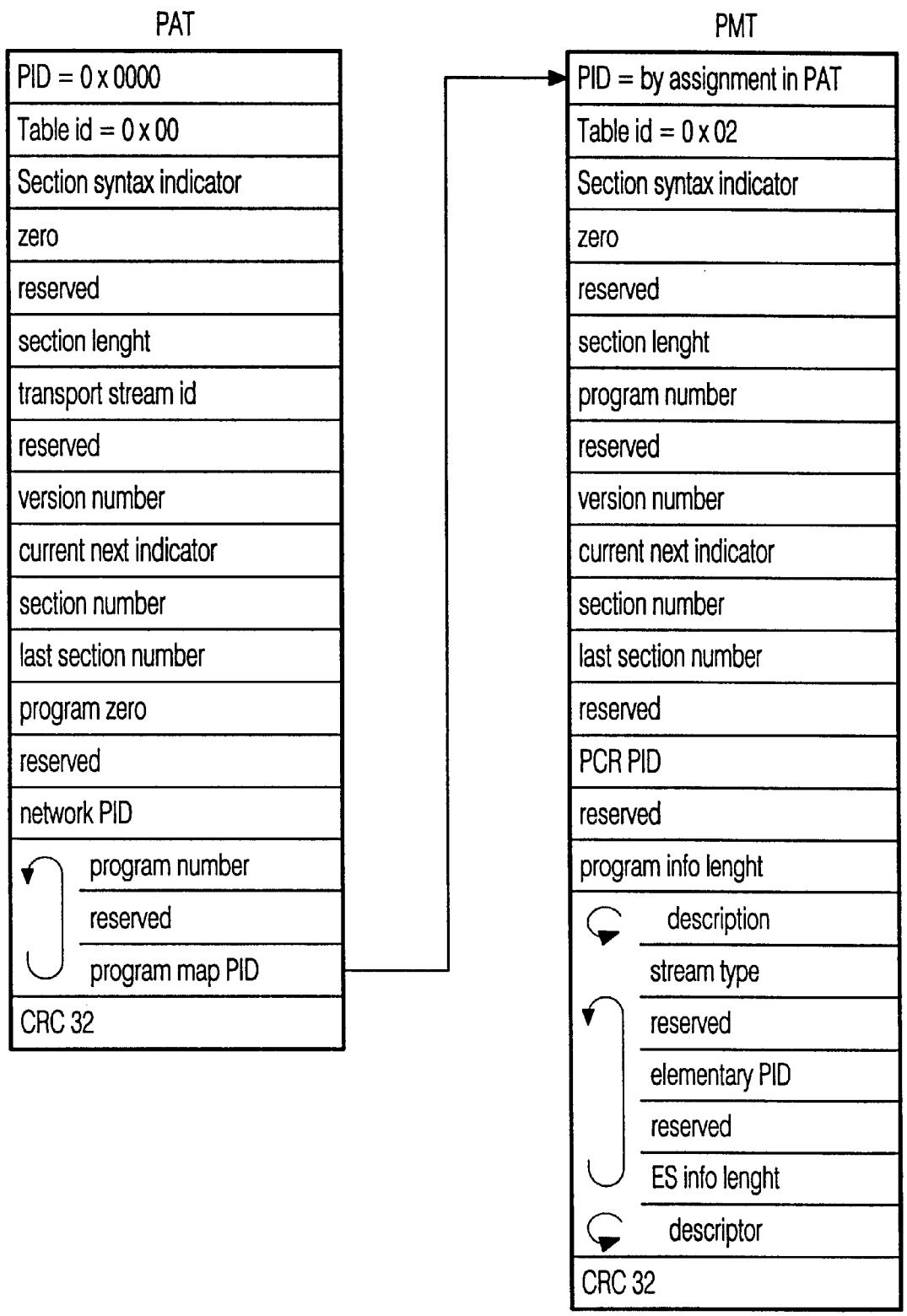
FIG. 4 shows the relation between PAT and PMT packet.

Video data that is transported in a transport stream, is multiplexed together with other information, such as, audio, videotext and PSI. At the receiver side, a program is demultiplexed in such a way that all the data of the same type, such as, video, audio, etc., are separated from the multiplexed stream. The way to demultiplex program information, is carried in the transport stream. Two tables, Program Association Table (PAT) and Program Map Table (PMT) carry information which enables a transport stream decoder to retrieve all the information for one program from the multiplexed transport stream. This process is described in detail in ISO/IEC 13818-1. After retrieving the video data from the multiplexed transport stream, elementary stream processing can be performed on the extracted video elementary stream. FIG. 4 shows the relation between the PAT and the PMT packets, respectively. The PAT packet contains all the available programs in the multiplexed transport stream. Each program number has an associated program map PID. This program map PID refers to the PMT packet which contains all the PID values that build up one program. This PMT table indicates which packet contains the video information. This is done by means of the stream type identifier and the corresponding elementary PID value.

Figure 5A:
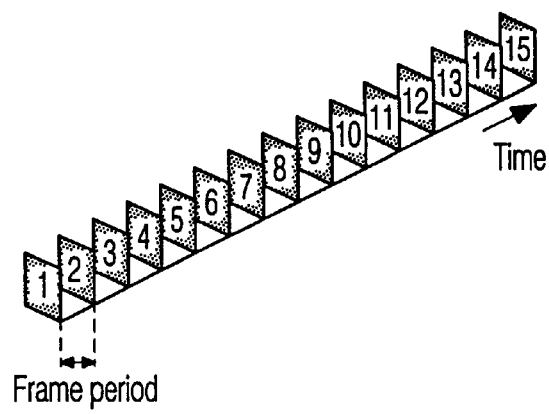
FIGS. 5a–5c show the temporal sub-sampling of a PCM video sequence, where
Figure 5B:
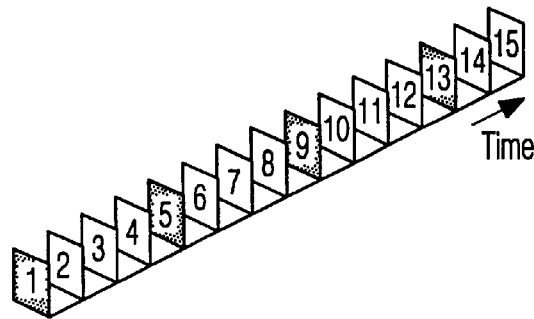
Figure 5C:
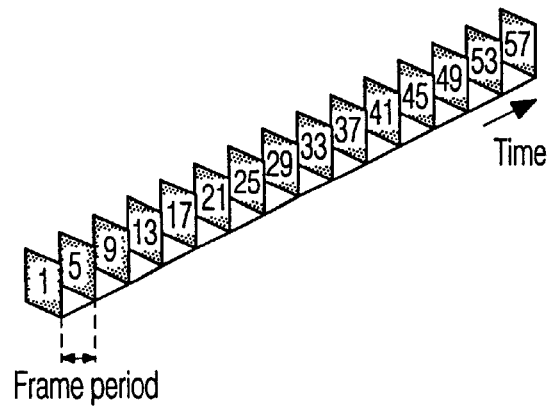

Low-end video trick play is based on re-use of pre-encoded video material. In case of DVB programs, this means pre-encoded MPEG video. Video trick play can be treated as a normal play video signal, that is sub-sampled in the temporal direction. Practically, this means that only some pictures in the temporal direction are of interest. The coarseness of the sub-sample process, the amount of pictures that are skipped, depends on the trick play speed. If a video sequence is available in the PCM domain, then the following graphical representation can be made. FIGS. 5a–5c contain three sketches. FIG. 5a indicates the pictures of a normal play stream on the time axis. FIG. 5b shows the same time axis as in FIG. 5a whereby the pictures that form the video contents of a trick play video sequence, with a speed of four times normal play speed, are dark colored, while the pictures that are skipped are transparent. Finally, FIG. 5c contains those pictures from a normal play sequence that form a trick play sequence which corresponds to four times normal play speed.

Figure 6A:
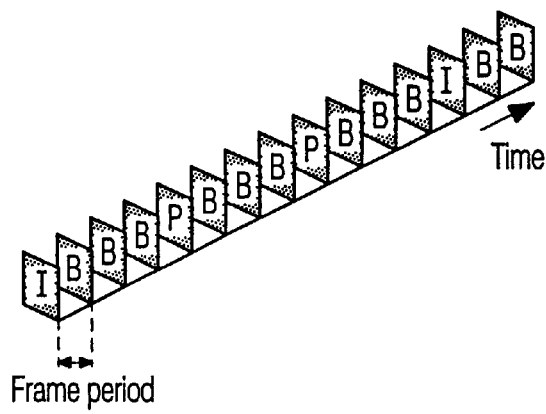
FIGS. 6a–6c show the temporal sub-sampling of an MPEG encoded video sequence with a GOP length N=12 and M=4, where
Figure 6B:
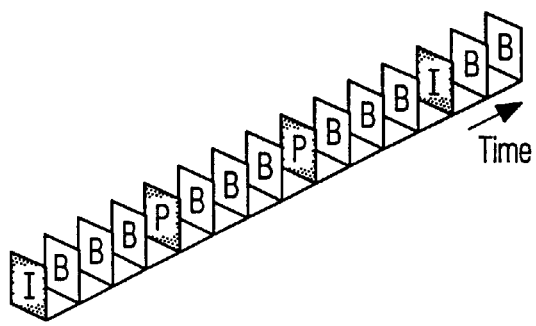
Figure 6C:
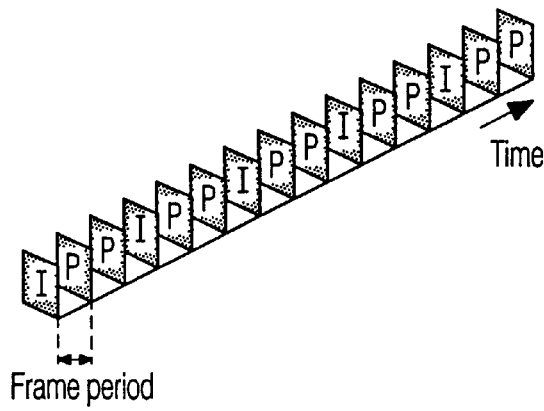

The process depicted in FIGS. 5a–5c can also be performed on MPEG pre-encoded video. FIGS. 6a–6c indicate this process. FIG. 6a shows an MPEG-encoded normal play video sequence with N=12 and M=4. Herein, N is the length of a GOP, and M is the P-frame distance. FIG. 6b indicates the sub-sample process for a GOP structure with N=12 and M=4. The dark colored pictures from FIG. 6b are selected to form the video trick play sequence. The transparent pictures are skipped. The filtered pictures form a video trick play sequence, see FIG. 6c. This video sequence not only contains the pictures that corresponds to the trick play speed, they even form a valid MPEG stream due to the fact that the motion estimation done at the encoder side makes use of the selected pictures. This enables the decoder to correctly reconstruct the encoded motion compensated pictures. This last point is important because this will normally not be the case.

Figure 7A:
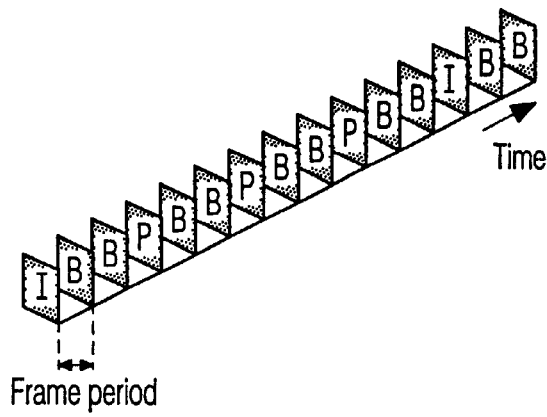
FIGS. 7a–7c show the temporal sub-sampling of a MPEG encoded video sequence with a GOP length N=12 and M=3, where
Figure 7B:
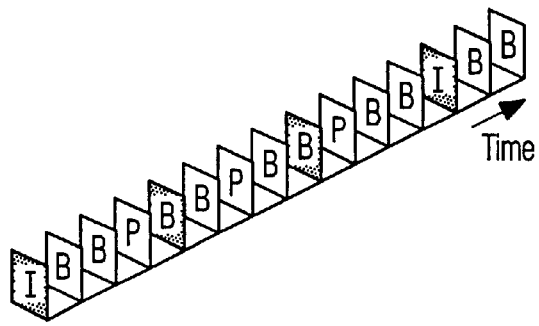
Figure 7C:
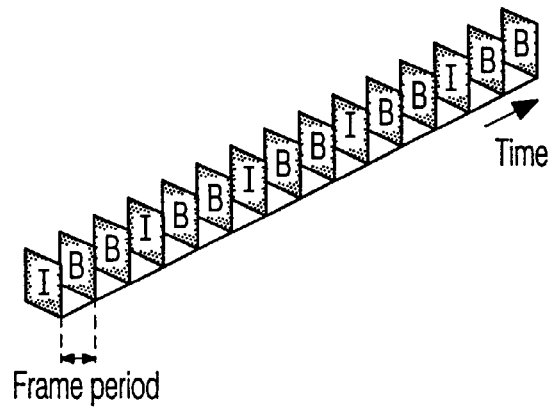

FIGS. 7a–7c indicate the same process, but the GOP has a different structure N=12 and M=3. When a video trick play stream is extracted from this GOP structure, whereby the filtered pictures corresponds to those that build up a video trick play sequence for four times normal play speed, the temporal MPEG reference is corrupted.

From the previous two examples, it can be concluded that only the intraframe-coded pictures can be re-used for trick play. The reason for this statement is two fold. First, these frames can be standalone decoded, no future or past picture information is necessary. Second, the pictures contain, beside the interlace effect, no temporal information. The interlace effect does only occur, when the original scene is interlaced. If the original video scene is progressive, e.g., film material, then there is no interlace effect when I-frames are repeated.

The elementary stream video processing has, as a task, to generate a valid video MPEG elementary stream that can be multiplexed into a MPEG transport stream. The video elementary stream has two main parameters that must meet specific requirements. The first parameter is the overall bit-rate that will be used for the trick play video elementary stream. The second parameter is the frame rate of the video elementary stream. This last parameter depends on the continent where the trick play stream is generated. A distinction can be made between continents that support 25 Hz frame rate and those that use 29.29 Hz or 30 Hz frame rate.

It has been stated before that for video trick play based on video extraction from a MPEG pre-encoded program, only the intraframe-encoded pictures can be used. The bit-cost of the intraframe-encoded pictures depends, beside the size of the picture, strongly on the overall bit-rate, that has been used to encode the normal play video elementary stream sequence. For the video elementary stream bit-rate, a simple expression can be used that defines the relation between the video elementary stream bit-rate and the bit-cost per picture. In case of a fixed bit-cost per picture, the overall bit-rate will be equal to equation 1.

$$\text{Video bit-rate} = \text{frame rate} * \text{frame bit-cost} \quad (1)$$

An MPEG-encoded video sequence will normally not have a fixed bit-cost per picture. Intraframe-encoded pictures will have a bit-cost that is larger than the bit-cost that is used for motion compensated pictures, such as, P- and B pictures. In general, an MPEG intraframe-encoded picture requires a transmission time that is larger than one display frame period. For typical I-frame bit-cost values see Table 2 and Table 3 for the required transmission times. For encoding parameters, see Table 4.

TABLE 2

TYPICAL I-FRAME BIT-COST VALUE FOUND IN NORMAL PLAY VIDEO SEQUENCES

| Normal play video sequence | Average I-frame bit-cost (Bits) | Minimum I-frame bit-cost (Bits) | Maximum I-frame bit-cost (Bits) |
| --- | --- | --- | --- |
| HARLEY | 770,084 | 430,896 | 1,099,696 |
| BARBWIRE | 281,126 | 45,984 | 564,568 |
| NEDERLAND-1 | 417,819 | 68,344 | 640,244 |
| GIRLS | 578,032 | 451,616 | 909,848 |

These Values Depend Heavily On:

The used MPEG encoder

The used GOP structure

The used picture size

TABLE 3

TYPICAL NORMAL PLAY I-FRAME TRANSMISSION TIMES

| Normal play video sequence | Average I-frame Transmission time (ms) | Minimum I-frame Transmission time (ms) | Maximum I-frame Transmission time (ms) |
| --- | --- | --- | --- |
| HARLEY | 81.9 | 45.8 | 116.9 |
| BARBWIRE | 82.6 | 13.5 | 166.0 |
| NEDERLAND-2 | 83.5 | 13.6 | 128.0 |
| GIRLS | 72.2 | 56.4 | 113.7 |

TABLE 4

ENCODING PARAMETERS FOR THE VIDEO SEQUENCES:
HARLEY, BARBWIRE, NEDERLAND-2 AND GIRLS

Normal play video sequence encoding parameters

| Video Sequence: | GOP parameters | | Bit rate | Amount of pels per | Amount of lines per |
|---|---|---|---|---|---|
| | M | N | Mbits/s | line | frame |
| HARLEY | 3 | 12 | 9.4 | 720 | 576 |
| BARBWIRE | 3 | 12 | 3.4 | 528 | 576 |
| NEDERLAND-2 | 1 | 12 | 5.0 | 544 | 576 |
| GIRLS | 3 | 12 | 8.0 | 720 | 576 |

With aid of the values from Table 2, some rough calculations can be preformed on the average bit-rates per I-frame for a GOP structure N=1. Table 5 contains the transmission bit-rates for the I-frames from Table 2. From the values depicted in Table 5, it should become clear, that generating a video trick play sequence with a GOP containing only the selected I-frame, and maintaining a frame rate of 25 Hz, requires a high trick play channel bit-rate. Due to the fact, that intraframe-encoded pictures are selected from the normal play video sequence, the peak bit-rate will requires huge channel bit-rates values, except for the BARBWIRE video sequence, and, in some cases, the required bandwidth is even higher than the maximum bit-rate allowed in some MPEG applications. For this reason, video trick play based on I-frame extraction will not be possible without extra signal processing. There are some methods that can be used to reduce the bandwidth problem and still obey the frame rate constrain.

A method that is relatively cheap to implement, is to insert so-called empty P-frames. Empty P-frame are pictures that force the decoder to display an exact copy of the previous decoded picture. Because no extra information is required by the decoder, the P-frame must only transmit the minimum MPEG requirements, which means that only the first and the last macro block of a slice needs to be transmitted. As a result, the empty P-frame bit-cost is very small. This signal processing step lowers the perceived refresh rate, but creates transmission time for the relative large I-frames. A disadvantage of this method is, that the picture refresh rate will be reduced, whereby the picture refresh rate can be reduced up to one picture per second, but with a spatial resolution equal to that of the original I-frame. A better method is to reduce the resolution of each intraframe-encoded picture. This method will increase the picture refresh rate, but, at the same time, reduce the spatial picture quality. Beside the lower spatial resolution, extra hardware complexity is added to the video trick play signal processing system.

TABLE 5

VIDEO ELEMENTARY STREAM TRICK PLAY BIT-RATES,
FOR N = 1 GOP LENGTH, BASED ON I-FRAME
SELECTION FROM A NORMAL PLAY VIDEO SEQUENCE

| Normal play video sequence | Average video bit-rate per frame for 25 Hz frame rate (Bits/s) | Minimum video bit-rate per frame for 25 Hz frame rate (Bits/s) | Maximum video bit-rate per frame for 25 Hz frame rate (Bits/s) |
|---|---|---|---|
| HARLEY | 19,252,100 | 10,772,400 | 27,492,400 |
| BARBWIRE | 7,028,150 | 1,149,600 | 14,114,200 |
| NEDERLAND-2 | 10,445,475 | 1,708,700 | 16,006,100 |
| GIRLS | 14,450,800 | 11,290,400 | 22,746,200 |

For trick play based on normal play I-frame selection, some merits can be defined with respect to hardware implementation. First, some merit parameters of I-frame selection from a normal play video sequence for one speed trick play generation will be given. These are:

I-frame can be selected by parsing the video elementary stream on byte basis

The parser required to extract the I-frame pictures from the normal play stream has low complexity, due to the fact that the stream at picture level is byte based.

High Spatial Quality Equal to the Original I-frame Resolution.

Because the selected I-frames are not transcoded, the original spatial resolution is maintained.

Next, some demerit parameters of normal play I-frame selection for one speed trick play generation will be given.

Low Picture Refresh Rate

Due to large I-frame bit-costs and a low bit-rate trick play channel, the transmission of one compressed intraframe-encoded picture requires more than one frame display period. Due to this, the picture refresh rate is lower than the frame rate.

Large Picture Buffer Size Required for Storage of MPEG Compressed I-frame. At Least one for Each Speed.

Due to the fact, that it requires several display frame periods to transmit the extracted I-frame, a buffer is required to store the extracted I-frame.

Perceived Trick Play Speed Depends on GOP Length.

The amount of I-frames that can be selected depends on the GOP length N of the normal play video stream. If the I-frame refresh time is larger than the trick play I-frame transmission time, then the trick play picture refresh is determined by the normal play GOP length N. In a worse case situation, N is equal to 1023.

Next, the bit-rate reduction by means of lowering the I-frame resolution will be described. Video trick play, based on I-frame selection from an MPEG-encoded video elementary stream, will have a bit-rate that is larger than the bit-rate of the original video elementary stream, when the I-frames are used to form a new MPEG video sequence, whereby the GOP length N, is equal to one, which means I-frame one. The bit-rate of such signals varies per picture, and can even be higher than the maximum allowed bit-rate as defined within some MPEG applications. In the above description, a solution was provided based on insertion of so called empty P-frames to the video trick play stream in order to lower the required channel bit-rate. Such a processing works quite well but can considerably lower the picture refresh rate, especially when the normal play video stream has a bit-rate that is higher than 6 Mbits/s and has full resolution, this means maximum horizontal- and vertical size.

For the Generation of Video Trick Play, Five Parameters are Important:

Frame rate

Picture bit-cost

Picture refresh rate

Spatial resolution

The first parameter is a constraint that must be obeyed, and is defined by the continent where the recording is performed. The second parameter can be calculated by removing the transport stream overhead from the trick play channel bit-rate. Only the third parameter can be modified, which will have a direct influence on the last two parameters. The picture refresh rate and the spatial resolution can be treated objectively as well as subjectively. Due to the I-frame transcoding, a large part of the picture content is removed. It is for this reason that an objective judgement will not be appropriate. A far better method is judgement according to subjective criteria.

The only way to increment the picture refresh rate is by lowering the I-frame bit-cost, which will reduce the required transmission time of an intraframe coded picture. A problem of the I-frame bit-cost reduction is the fact that an I-frame cannot be endlessly reduced. In fact, the smallest bit-cost is based on the bit-cost required to create a spatial resolution, whereby only the DC value of each DCT block is transmitted. Practically, this means that the final bit-cost is determined by the sum of all the elementary stream system overhead plus the bits required to represent the DC value for each DCT block. The elementary stream overhead information depends strongly on the picture size. Table 6, contains intraframe transcoded pictures with only DC resolution. With aid of these values, the minimum available I-frame bit-cost that must be available can be calculated. This calculation makes use of the values, which are depicted in Table 1 and Table 6. The video quality obtained with DC only, forms the lowest possible quality. Poor is the subjective indication that corresponds to this video quality. The trick play channel bit-rate from Table 1 is used to transmit a video transport stream. Because video trick play transport streams contain, beside PSI information, only video information, the transport stream overhead can be reduced to 5% of the total trick play channel bit-rate. Table 7 contains the available elementary stream video bit-rate.

TABLE 6

INTRAFRAME TRANSCODED PICTURES CONTAINING DC RESOLUTION

| Normal play video sequence | Average video bit-cost (Bits) | Minimum video bit-cost (Bits) | Maximum video bit-cost (Bits) |
| --- | --- | --- | --- |
| HARLEY | 108326 | 83600 | 122488 |
| BARBWIRE | 77329 | 53944 | 97200 |
| NEDERLAND-2 | 55012 | 48032 | 60176 |
| GIRLS | 78915 | 75336 | 81840 |

TABLE 7

ELEMENTARY VIDEO BIT-RATE FOR 30 HZ AND 29.97 HZ DRUM FREQUENCY

| Scanner revolution | Trick play video bit-rate (bits/s) |
| --- | --- |
| 30 Hz | 2186064 |
| 29.97 Hz | 2183880.11 |

The video elementary stream bit-rates, that are available in Table 7, should be used to transmit 25 Hz, 29.97 Hz or 30 Hz video. Table 8 contains the bit-cost for each frame rate, in case of a fix bit-cost per picture.

TABLE 8

I-FRAME BIT-COST, FOR 25 HZ, 29.97 HZ AND 30 HZ FRAME RATE

| Frame rate | Picture bit-cost (bits) |
| --- | --- |
| 30 Hz | 72868 |
| 29.97 Hz | 72868 |
| 25 Hz | 87442 |

The bit-cost per picture, depicted in Table 8, is not sufficient to transcode selected MPEG-2-encoded I-frames in order to re-use them for trick play. This is caused by the fact that the required picture bit-cost values are less than the maximum values in Table 6. The only way to make a low-end trick play system work, is by reducing the picture refresh rate.

Subjectively judged simulations with respect to the minimum required picture refresh rate, have shown that a picture should maximally be three times repeated. For a 25 Hz frame rate environment, this means that the actual picture refresh rate is 8.3 Hz. For the 30 Hz and 29.97 Hz frame rate situations, this results in a 10 Hz picture refresh rate.

By reducing the picture refresh rate, the minimum required temporal refresh rate is obeyed. Because of the picture refresh reduction of a factor three, the I-frame bit-cost is almost tripled in size. Only a small part of the I-frame bit-cost must be spend on the empty P-frame. For 30 Hz and 29.97 Hz frame rate systems, the maximum empty-P-frame size is 2800 bits, whereby, for the 25 Hz frame rate system, the maximum empty P-frame bit-cost is 3328 bits.

TABLE 9

I-FRAME BIT-COST, FOR 25 HZ, 29.97 HZ AND 30 HZ FRAME RATE, WITH A PICTURE REFRESH REDUCTION OF A FACTOR 3

| Frame rate | I-frame bit-cost (bits) |
| --- | --- |
| 30 Hz | 218604 − 5600 = 213004 |
| 29.97 Hz | 218604 − 5600 = 213004 |
| 25 Hz | 262326 − 6656 = 255670 |

The calculation to determine the minimum bit-cost size for a transcoded I-frame with DC resolution is strongly based on the statistic behavior of natural video. Beside the video elementary stream overhead, it is strongly determined by the bit-cost required to represent the DC value of the DCT matrix.

The video sequences used for the simulations covers a broad range of possible bit-rates. Not only the bit-rate is an important parameter, also the picture format, horizontal- and vertical size, of the used video sequences is important. For this reason, the video sequences are chosen in such a way that different picture sizes form part of the normal play video analysis.

In order to transcode an I-frame, two possible transcoding operations could be applied:

Full MPEG decoding up to DCT level, full re-encode at the desired lower bit-rate Selection of runlength-level-encoded DCT coefficients The first method requires high hardware complexity, but will result in an acceptable up to good picture quality. The second method requires modest hardware complexity, and will result in a poor up to good picture quality. Only the second method, is acceptable in case of low-end video trick play.

Next, the bit-cost reduction by means of runlength-level-encoded DCT AC coefficient selection will be described.

As indicated above, a low-end way of reducing the I-frame bit-cost, is by means of runlength-level-encoded AC coefficient selection. MPEG makes use of a DCT transformation to remove spatial correlation before it is visually weighted quantized, to disregard the less important information in a picture. After quantization, the DCT coefficients are scanned, either zigzag or by means of an alternative scan method, and runlength-level encoded. In order to reach the runlength-level-encoded DCT coefficients, the video elementary stream must be parsed, starting at the picture header all the way down to the block layer. A part of this parsing process can be done on a byte basis, after the slice header this process must be performed by means of variable length decoding see ISO/IEC 13818-2.

The DCT transformation has the advantage that the important energy that builds up the 8-pels by 8-lines data block is depicted in the upper left corner of the DCT matrix. This means that, e.g., with aid of the first 20 AC coefficients, the maximum amount of AC coefficient per DCT matrix is 63, the most relevant part of the 8-pels by 8-lines data block can be reconstructed. A subjective spatial good quality of the picture can be maintained by transmitting these 20 AC coefficients. When a large number of AC coefficients are removed, then the spatial subjective quality can no longer be maintained and visible artefacts are introduced. This will be the case when, for each runlength-level-encoded DCT block, only the first 2 or 3 AC coefficients are selected and transmitted. The amount of AC coefficients available in an I-frame DCT Block, depends strongly on the bit-rate at which the original video sequence is encoded, as well as on the contents of the encoded 8-pels by 8-lines data block.

By means of experiments, the consequence of selecting a certain number of lower AC coefficients have been studied. Target of this experiment has been, that the resulting video elementary stream bit-rate must fit into the D-VHS trick play channel. The picture refresh rate has been put at 8.3 Hz and the frame rate is equal to 25 Hz. Tables 10, 11, 12 and 13 contains the results of this study.

TABLE 10

AC SELECTION VERSUS I-FRAME BIT-COST AND AVERAGE BIT-RATE, SEQ. HARLEY

| No. of AC coefficients per component type | | | | | | Average bit-rate GOP = IPP |
|---|---|---|---|---|---|---|
| Y | U | V | Average bit-cost | Min. bit-cost | Max. bit-cost | Mbits/s |
| 2 | 2 | 2 | 202015 | 120392 | 243144 | 1.751592 |
| 3 | 2 | 2 | 219484 | 130216 | 267824 | 1.897179 |
| 4 | 2 | 2 | 245087 | 138264 | 305064 | 2.111010 |
| 5 | 2 | 2 | 271733 | 152944 | 341760 | 2.333940 |

TABLE 11

AC SELECTION VERSUS I-FRAME BIT-COST AND AVERAGE BIT-RATE, SEQ. BARBWIRE

Normal play video sequence: HARLEY

| No. of AC coefficients per component type | | | | | | Average bit-rate GOP = IPP |
|---|---|---|---|---|---|---|
| Y | U | V | Average bit-cost | Min. bit-cost | Max. bit-cost | Mbits/s |
| 15 | 10 | 10 | 200232 | 63448 | 496664 | 1.735113 |
| 18 | 12 | 12 | 208029 | 65032 | 550376 | 1.796715 |
| 20 | 15 | 15 | 214816 | 67424 | 579280 | 1.858316 |

TABLE 12

AC SELECTION VERSUS I-FRAME BIT-COST AND AVERAGE BIT-RATE, SEQ. NEDERLAND-2

Normal play video sequence: NEDERLAND-2

| No. of AC coefficients per component type | | | | | | Average bit-rate GOP = IPP |
|---|---|---|---|---|---|---|
| Y | U | V | Average bit-cost | Min. bit-cost | Max. bit-cost | Mbits/s |
| 10 | 10 | 10 | 237826 | 131856 | 237826 | 2.058140 |
| 12 | 10 | 10 | 253752 | 140688 | 318552 | 2.186047 |
| 15 | 10 | 10 | 339672 | 150784 | 270292 | 2.325582 |

TABLE 13

AC SELECTION VERSUS I-FRAME BIT-COST AND AVERAGE BIT-RATE, SEQ. GIRLS

Normal play video sequence: GIRLS

| No. of AC coefficients per component type | | | | | | Average bit-rate GOP = IPP |
|---|---|---|---|---|---|---|
| Y | U | V | Average bit-cost | Min. bit-cost | Max. bit-cost | Mbits/s |
| 5 | 2 | 2 | 251761 | 226728 | 291288 | 2.200000 |
| 8 | 5 | 2 | 301307 | 264992 | 363648 | 2.600000 |
| 10 | 8 | 8 | 334409 | 294664 | 412272 | 3.000000 |

The video trick play sequence that is generated from those normal play streams with N=12 corresponds to a trick play speed that is equal to four times normal play speed. Due to the fact that a temporal picture refresh reduction of a factor three is required in order to transmit the transcoded I-frame, all the normal play video GOP structure, whereby N=12, will lead to the same trick play video sequence. For all the normal play video sequences which have a GOP length of N smaller or equal to twelve, the generated trick play sequence has an exact relation with respect to the normal play video sequence. This exact relation will not be maintained when the normal play video sequences have a GOP length greater than twelve.

The video trick play quality depends strongly on the normal play video bit-rate, as well as on the picture size. For the I-frame transcoding, the human visual system has been taken into account. For this reason the color difference signals have been transcoded with less runlength-level-encoded AC coefficients than the luminance signal.

For those normal play video sequences which have a lower horizontal size, such as, BARBWIRE and NEDERLAND-2, and also have an acceptable bit-rate, the achieved subjective video quality is ranked acceptable up to good. For the normal play video sequences HARLEY and GIRLS, the obtained video trick play quality is ranked poor up to acceptable. The reason for this subjective lower video quality is two fold. First, the normal play bit-rate is high; second, the horizontal picture size has the maximum values allowed for some MPEG applications.

The subjective quality is strongly influenced by the amount of visible artefacts. Two main types of artefacts can be distinguished. First, artefacts due to removing information that form fine details. Second, artefacts due to removing information that built up discontinuities, such as edges, within the spatial area. This last artefact has a strong influence on the subjective judgement of the video trick play sequence.

From the I-frame Transcoding Results, the Following Conclusions can be Made:

For normal play MPEG-encoded video sequences with bit-rates higher than 6 Mbit/s, especially for those sequences which have 720 pels per line and 576 lines per frame, strong artefacts are introduced because only a few runlength-level-encoded AC coefficient can be selected in order to stay within the available bit-cost.

For normal play MPEG-encoded video sequences with bit-rates less than 6 Mbits/s, more runlength-level-encoded AC coefficients can be selected which reduces considerably the amount of clearly visible artefacts.

To reduce the amount of clearly visible artefacts for those situations where discontinuities occur in the spatial area, a smart allocation of runlength-level-encoded AC coefficients per DCT block is required. DCT blocks that contain less important information require a low number of AC coefficients. Those DCT blocks that contain information that is required to reconstruct discontinuities, require a higher number of AC coefficients. This requires knowledge of the picture content of the 8-pels by 8-lines data block in order to distinguish DCT blocks which contains discontinuities, and those DCT blocks that contain less important information, such as, flat areas with no details.

Next, the differential-dc controlled selection of runlength-level-encoded DCT AC coefficients will be described.

A uniform assignment of runlength-level-encoded AC coefficients for each intraframe-encoded DCT block leads to a subjective spatial video quality that lies in the range between poor up to acceptable when the bit-rate of the MPEG-2 encoded video sequence is higher than 6 Mbits/s. The following description will deal with a bit-cost reduction method that can be used to enhance the subjective spatial picture quality for video trick play based on I-frame extraction from an MPEG-2 pre-encoded video sequence.

Natural video has temporal as well as spatial correlation. MPEG video compression makes use of this correlation to reduce the video bit-rate while maintaining a subjective good picture quality. For intraframe-encoded pictures, the DCT coefficients within a given block are almost completely de-correlated. However there is still some correlation between the coefficients in a given block and the coefficients of neighboring blocks. This is especially true for the block averages represented by the DC coefficients. For this reason, the DC coefficient is coded separately from the AC by a predictive DPCM technique. As shown in equation 2, the DC value of the neighboring block just coded (from the same component), P, is the prediction for the DC value in the current block. The difference, ΔDC, is usually close to zero.

$$\Delta DC = DC - P \qquad (2)$$

Figure 8:
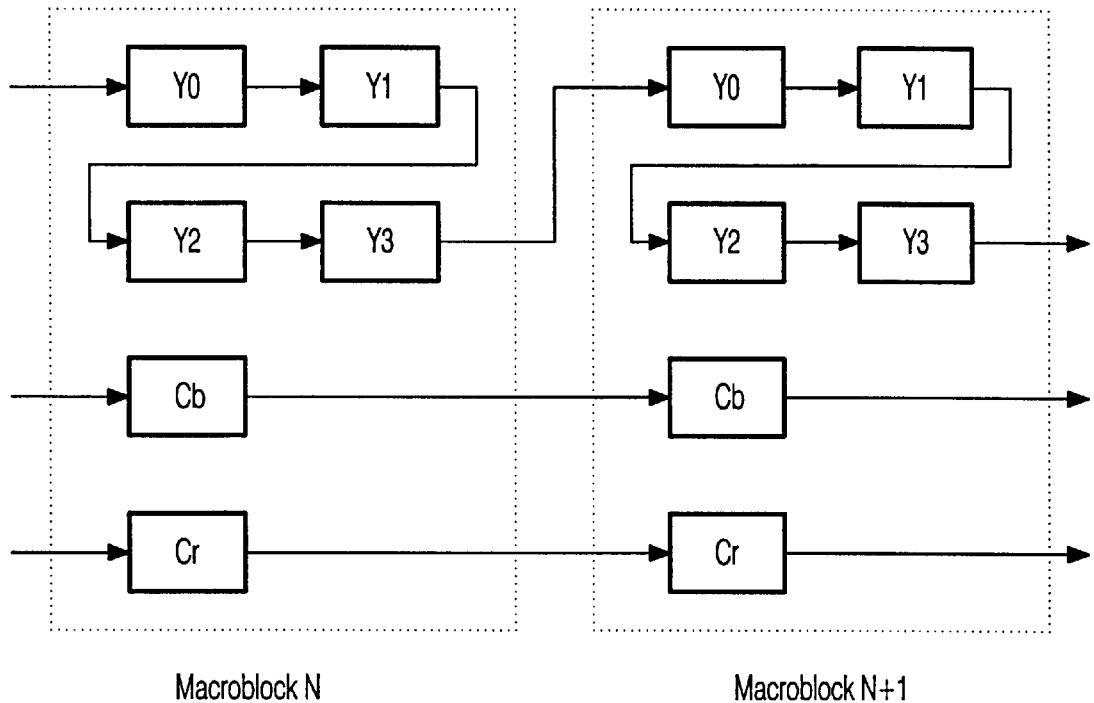
FIG. 8 shows the scan pattern of DCT blocks within a slice.

The prediction is determined by the coding order of the blocks in the macro block. FIG. 8 provides a sketch of the coding and prediction sequence. The coding of ADC is done by coding a size category and additional bits that specify the precise magnitude and sign. The size category determines the number of additional bits required to fully specify the DC difference.

For those situations where there are significant changes in the 8-pels by 8-lines data blocks, such as, e.g., at edges, there will be a difference between the two succeeding DCT DC values, which is not close to zero. The maximum value depends on the amount of bits used to encode the DC value. The amount of bits are indicated in the picture coding extension. For some MPEG applications, the maximum amount of bits used to represent the DC magnitude, also known as differential DC, is 10 bits, for luminance as well as for chrominance DC see ISO/IEC 13818-2 Table 8.5, the maximum amount of bits that can be allocated for the DC size value is 9 bits for luminance and 10 bits for chrominance.

With the aid of this 10-bit differential DC value, a table can be defined with the range of the magnitude DC, see Table 19. The differential DC value can be used to control the AC coefficient assignment process.

The statistical behavior of the differential DC value has been studied. For this purpose, four classes have been defined to determine the statistical character of the differential DC value. Table 14 contains the defined classes.

TABLE 14

CLASS DEFINITION FOR STATISTIC ANALYSIS OF THE DIFFERENTIAL DC VALUE

| Class one | Class two | Class three | Class four |
|---|---|---|---|
| diff. DC value = 0 | 0 < diff. DC value < 5 | 5 <= diff. DC value < 15 | diff. DC value >= 15 |

In order to perform a statistical analysis on a collection of obtained measurement results, classes are defined. The class width is normally equal for all the classes. For the analysis of the differential DC, a different approach has been made. It has been stated before that for normal video sequences, there is spatial as well as temporal correlation. For this analysis, only the spatial correlation is important. Due to this correlation, the differential DC will be small, and perhaps even zero. For this reason, the class definition has been made according to Table 14. Although the range of the differential DC values belongs to the collection of integers, the statistic analysis is based at non-negative integers, including the value zero. This is valid because the range is symmetric, see Table 19 and ISO/IEC 13818-2, par. 7.2.1. For four MPEG-2-encoded video sequences, a statistical analysis of differential DC value has been performed. For this analysis, a distinction has been made between the three video components Y,U and V. The results of those measurements are available in Tables 15, 16, 17 and 18.

TABLE 15

DIVISION OF DIFFERENTIAL DC VALUE ACCORDING TO THE CHOSEN CLASS DEFINITION FOR VIDEO SEQUENCE HARLEY

| Luminance comp. Y | | | | Chrominance comp. U | | | | Chrominance comp. V | | | |
|---|---|---|---|---|---|---|---|---|---|---|---|
| Cl. 1 (%) | Cl. 2 (%) | Cl. 3 (%) | Cl. 4 (%) | Cl 1 (%) | Cl. 2 (%) | Cl. 3 (%) | Cl. 4 (%) | Cl. 1 (%) | Cl. 2 (%) | Cl. 3 (%) | Cl. 4 (%) |
| 10 | 25 | 12 | 19 | 4 | 7 | 4 | 2 | 4 | 7 | 3 | 2 |

TABLE 16

DIVISION OF DIFFERENTIAL DC VALUE ACCORDING TO THE CHOSEN CLASS DEFINITION FOR VIDEO SEQUENCE GIRLS

| Luminance comp. Y | | | | Chrominance comp. U | | | | Chrominance comp. V | | | |
|---|---|---|---|---|---|---|---|---|---|---|---|
| Cl. 1 (%) | Cl. 2 (%) | Cl. 3 (%) | Cl. 4 (%) | Cl 1 (%) | Cl. 2 (%) | Cl. 3 (%) | Cl. 4 (%) | Cl. 1 (%) | Cl. 2 (%) | Cl. 3 (%) | Cl. 4 (%) |
| 11 | 32 | 16 | 8 | 4 | 9 | 3 | 1 | 5 | 9 | 2 | 0 |

TABLE 17

DIVISION OF DIFFERENTIAL DC VALUE ACCORDING TO THE CHOSEN CLASS DEFINITION FOR VIDEO SEQUENCE NEDERLAND-2

| Luminance comp. Y | | | | Chrominance comp. U | | | | Chrominance comp. V | | | |
|---|---|---|---|---|---|---|---|---|---|---|---|
| Cl. 1 (%) | Cl. 2 (%) | Cl. 3 (%) | Cl. 4 (%) | Cl 1 (%) | Cl. 2 (%) | Cl. 3 (%) | Cl. 4 (%) | Cl. 1 (%) | Cl. 2 (%) | Cl. 3 (%) | Cl. 4 (%) |
| 10 | 28 | 14 | 14 | 4 | 10 | 2 | 1 | 5 | 10 | 1 | 1 |

TABLE 18

DIVISION OF DIFFERENTIAL DC VALUE ACCORDING TO THE CHOSEN CLASS DEFINITION FOR VIDEO SEQUENCE BARBWIRE

| Luminance comp. Y | | | | Chrominance comp. U | | | | Chrominance comp. V | | | |
|---|---|---|---|---|---|---|---|---|---|---|---|
| Cl. 1 (%) | Cl. 2 (%) | Cl. 3 (%) | Cl. 4 (%) | Cl 1 (%) | Cl. 2 (%) | Cl. 3 (%) | Cl. 4 (%) | Cl. 1 (%) | Cl. 2 (%) | Cl. 3 (%) | Cl. 4 (%) |
| 15 | 28 | 11 | 13 | 4 | 8 | 3 | 2 | 4 | 9 | 2 | 1 |

An algorithm can be developed that defines how the runlength-level-encoded AC coefficients can be assigned per DCT block, taking into account the differential DC value and its statistical occurrence. Beside the assignment algorithm, a buffer regulation algorithm is required in order to prevent a I-frame picture buffer overflow during the transcoding process.

TABLE 19

VARIABLE LENGTH CODES FOR DIFFERENTIAL DC VALUE

| Range of differential DC | Size |
|---|---|
| −2047 to −1024 | 11 |
| −1023 to −512 | 10 |
| −511 to −256 | 9 |
| −255 to −128 | 8 |
| −127 to −64 | 7 |
| −63 to −32 | 6 |
| −31 to −16 | 5 |
| −15 to −8 | 4 |

TABLE 19-continued

VARIABLE LENGTH CODES FOR DIFFERENTIAL DC VALUE

| Range of differential DC | Size |
|---|---|
| −7 to −4 | 3 |
| −3 to −2 | 2 |
| −1 | 1 |
| 0 | 0 |
| 1 | 1 |
| 2 to 3 | 2 |
| 4 to 7 | 3 |
| 8 to 15 | 4 |
| 16 to 31 | 5 |
| 32 to 63 | 6 |
| 64 to 127 | 7 |
| 128 to 255 | 8 |
| 256 to 511 | 9 |
| 512 to 1023 | 10 |
| 1024 to 2048 | 11 |

Next, the assignment of AC coefficients will be further described. The spatial resolution of the transcoded I-frame is determined by the number of runlength-level-encoded AC coefficients per DCT block. The bit-cost that can be used to transcode the intraframe-encoded pictures is depicted in Table 9. The optimum spatial resolution can be obtained when this bit-cost is completely used by the transcoding process. This will lead to a fixed bit-cost per I-frame, because the maximum bit-cost is limited in size. A fixed bit-cost I-frame together with the empty P-frames, which also have a fixed bit-cost per picture, results in a fixed bit-cost per GOP. When the I-frame transcoding process is not optimally performed, then stuffing can be performed in order to reach the maximum I-frame bit-cost.

The main task of the transcoding algorithm will be two-fold. First, generate a spatial resolution that is more or less constant over the whole screen. Second, the whole picture must be transcoded in such a way that its final bit-cost is lower or equal to the maximum value depicted in Table 9. To obtain a spatial resolution that is equal over the whole screen, the transcoding algorithm must take care that the bit-cost per slice is constant. At the start of the transcoding process, a calculation can be done to define a target slice bit-cost. For this calculation, it is necessary that the elementary stream overhead is known. This overhead can vary in size due to the fact that at the encoder side, extra information is embedded in the video elementary stream. A decoder, on the other hand, does not need all this information. In order to perform the decoder process correctly, an elementary stream video decoder only requires the following headers and its corresponding extensions:

Sequence header

Sequence extension

GOP header

Picture header

Picture coding extension

Quant matrix extension

Although there are more headers and extensions defined in the ISO/IEC 13818-2 standard, these headers and extensions form the minimum required information necessary to decode the MPEG-encoded video, which is the highest profile and level that will be recorded by D-VHS MPEG-2 STD mode format.

During the transcoding process, the received overhead that is minimally required will be subtracted from the maximum available bit-cost. After subtraction, the final bit-cost remains that can be used for the transcoding process. The assignment of the number of runlength-level-encoded AC coefficients depends on the number of AC coefficients that corresponds to the differential DC value. Because a one time initialization of the amount of AC coefficients that will be assigned to a DCT block does not guarantee that the bit-cost of the transcoded I-frame is equal or lower than the maximum bit-cost of Table 9, a buffer regulation is required. For the transcoding process, two parameters are used for the buffer regulation:

Running slice bit-cost

Running frame bit-cost

Figure 9:
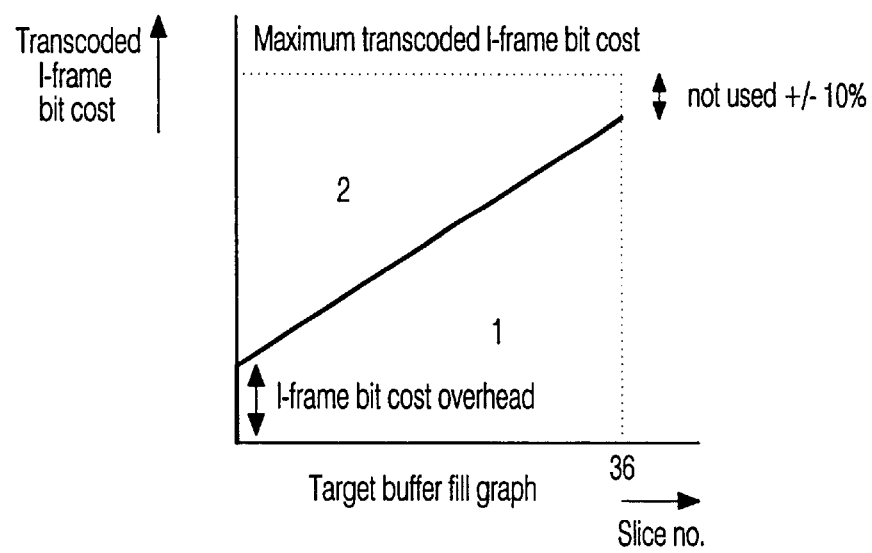
FIG. 9 shows the filling degree of the transcoder I-frame buffer.

The running slice bit-cost, keeps track of the amount of bits used for the current transcoded I-frame slice. The running frame bit-cost keeps track of the total amount of bits spend on the up to then transcoded slices. A graphical representation can be made of the buffer filling of the I-frame transcoding process, see FIG. 9.

The assignment of the AC coefficients per DCT block is a function of the differential DC value and depends on:

The normal play bit-rate

The normal play picture size

The running slice bit-cost counter

The running frame bit-cost counter

The frame bit-cost difference

The first two parameters, are responsible for the initialization of the I-frame transcoder. With aid of these parameters, the number of AC coefficients that will be assigned per class to a DCT block are defined. For a possible assignment see Tables 10, 11, 12 and 13.

Figure 10:
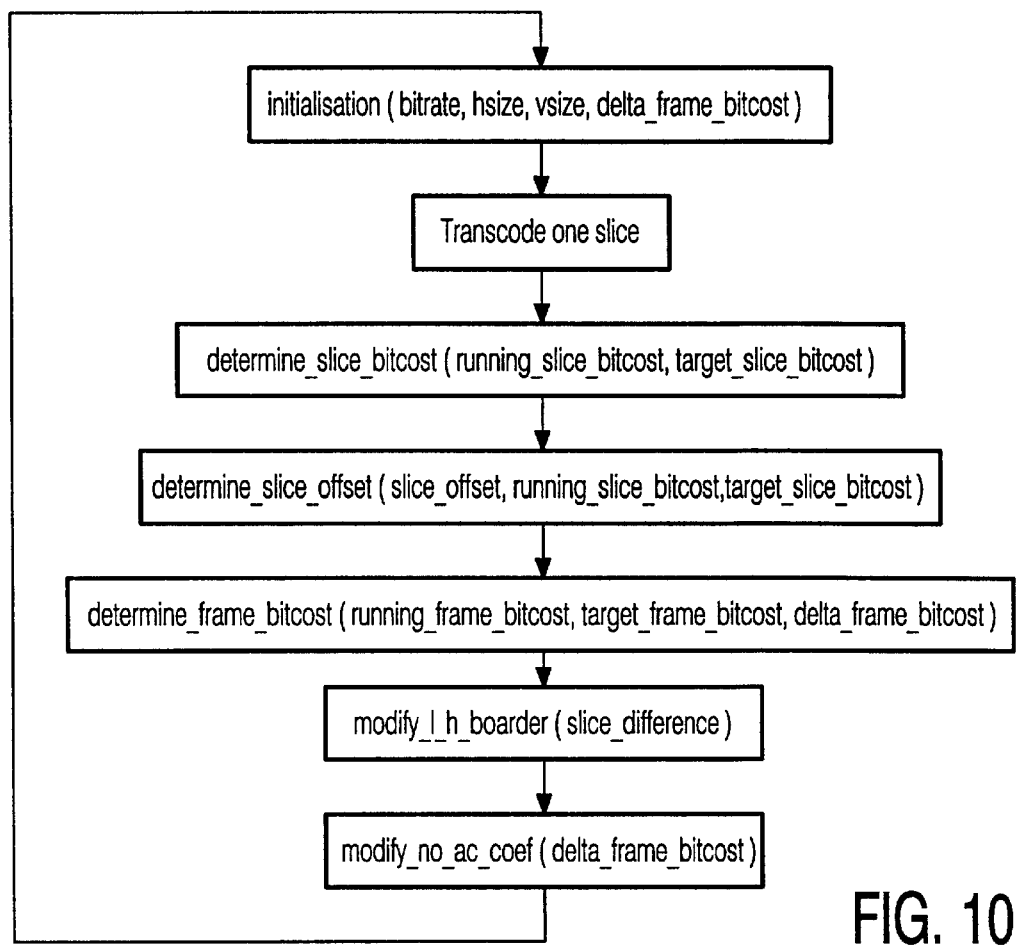
FIG. 10 shows a flowchart for the I-frame transcoding buffer regulation.

A one-time initialization will not be sufficient. The assigned number bits per slice, is not known before hand. This means that afterwards, a check has to be performed to see if the assumptions, as they were done during initialization, were correct. FIG. 10 indicates a overall flowchart of a possible transcoding buffer regulation process.

The flowchart contains functions and its corresponding arguments between brackets. The corresponding software model contains a precise description of the buffer regulation. The main parameters that are controlled by the buffer regulation are the borders of the classes as they where defined for the statistical analysis and the number of AC coefficients that will be assigned per DCT block. This action is taken at the bottom of the flowchart by the 'modify_l_h_boarder( . . . )' and 'modify_no_ac_coef( . . . )' blocks, respectively.

A further way of data compressing the information in a trick play signal, is by way of macroblock truncation. Macroblock truncation means that one or more macroblocks in each slice of a picture, more specifically, counted from the right hand side of the picture, are deleted. A received DVB program has an unknown bit-rate as well as an unknown picture size. For all possible signal situations, the transcoding process should work properly. Macroblock truncation is a possible step that can be applied in critical situations, as data reduction method, as well as that it can be used to allows for a better subjective picture quality.

The main task of the transcoding process is to generate a valid MPEG video elementary stream. In a specific application, the maximum number of bits per macroblock is 4608 bits. If such a stream enters the transcoding system, the chance that a transcoded picture fits into the target bit-cost, is small. For this situation, macroblock truncation offers the possibility to strongly reduce the bit-cost of the incoming intraframe-encoded pictures. Because a picture of one macroblock per slice is a valid picture, the transcoder can give the guarantee that under all circumstances a valid video stream can be generated.

Macroblock truncation can also be used to enhance the subjective video quality. This is done by deleting the last 5 or ten macroblocks or even more of all slices. The bit-cost that would be used to transcode the deleted right hand portion of the picture, can now be spent on the remaining portion of the picture. Due to the fact that the decoder performs an up-sampling in horizontal direction, the viewer will still have a full screen video. Because up-sampling in horizontal direction is performed by the decoder, the shape of the objects in the spatial area are stretched horizontally. This can become annoying if too may macroblocks are deleted.

Next, the generation of six trick play video signals will be described.

Figure 11:
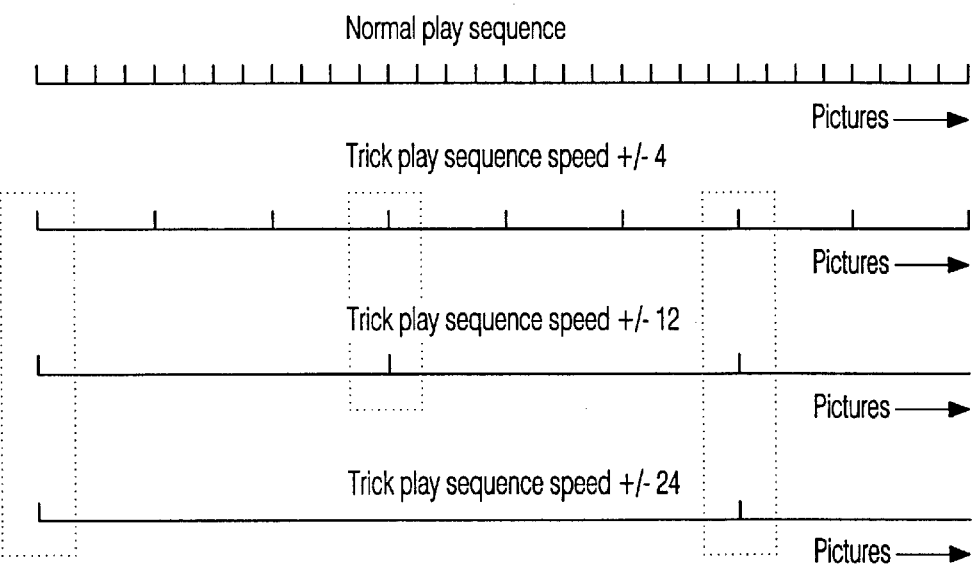
FIG. 11 indicates the relation between the pictures for the different trick play tape speeds.

The example of the track select trick play system described above supports six different trick play speeds, +/4, +/−12 and +/−24. All these trick play speed have their own trick play areas on tape, which form a virtual channel that, during recording, will be filled with a video trick play transport stream. In order to prevent the implementation of six different I-frame transcoders, re-usability of trick play video will be performed. Re-usability is enabled by the fact that a fixed bit-cost per GOP is used. The supported trick play speeds have a common dividend. The video trick play which corresponds to speed +/−12 and +/−24 can both be deducted from speed +/−4. FIG. 11 indicates the relation between the pictures for the different trick play tape speeds.

When video trick play information is extracted from the +/−4 times video trick play speed, in order to generate video trick play for higher tape speeds, such as, +/−12 and +/−24, respectively, care must be taken to prevent a video elementary stream buffer overflow. This bit buffer must never overflow. This is the responsibility of the MPEG encoder. The video trick play transcoder has the function of an MPEG encoder and, for this reason, carries the responsibility not to cause a video bit buffer overflow. Although this point is highly important, it does not require any special attention. The only stream that is really generated by the video transcoder is the video trick play stream that corresponds to four times normal play speed. This video elementary stream conforms to the MPEG constrains. Due to the fact that a fixed bit-cost per GOP is used, the video trick play streams extracted from this video stream fulfil, automatically, the MPEG constrains and a buffer overflow is prevented. FIG. 12 shows the extraction of higher video trick play speeds from the four times video trick play speed in the compressed domain. As shown in FIG. 12, the trick play information signal for the higher video trick play speed can be obtained by sub-sampling the trick play information for the lowest video trick play speed.

Next, the generation of a trick play information signal for reverse video trick play will be described. The obtained forward video trick play streams can be used to generate reverse video trick play as well. In order to generate reverse video trick play, the GOP based video needs to be swapped. FIG. 13 indicates this process.

Next, a practical implementation of low-end video trick play will be given. In the description given above, the video elementary stream processing has been explained in order to obtain the best spatial resolution and temporal picture refresh rate. The description that follows will provide a practical implementation based on the results from the description given above.

The trick play channel bandwidth that is available for video trick play at transport stream level is depicted in Table 1. In the earlier description, an assumption has been made that the transport stream overhead is 5% of the total bit-rate. In the following description, the exact transport stream overhead will be calculated. For the calculation of the transport stream overhead, a distinction can be made between the supported frame rates. For D-VHS MPEG-2 STD mode format, three different frame rates, i.e., 30 Hz, 29.97 Hz and 25 Hz, are supported. Due to the fact that two scanner revolutions, i.e., 30 Hz and 29.97 Hz, are supported, the supported frame rates can be depicted at the supported scanner rate. Table 20 indicates the supported recording modes.

TABLE 20

SUPPORTED RECORD AND PLAYBACK SCANNER RATE MODES

| Frame rate | Record and playback scanner rate |
|---|---|
| 25 Hz | 25 Hz |
| 30 Hz | 30 Hz |
| 29.97 Hz | 29.97 Hz |

Table 20 indicates that there is a perfect fit for the 30 Hz frame rate situation and the 29.97 Hz frame rate situation. Each revolution of the scanner is equal to one display period.

The GOP length N used for the video trick play elementary stream is equal to three. This means that for the 30 Hz frame rate as well as for the 29.97 Hz frame rate, the signal is periodic with 3 frame periods, or, in other words, three revolutions of the drum. As a consequence of this periodicity and the fact that 51 transport stream packets are recorded per revolution, the video trick play GOP as defined above can be depicted at 153 transport stream packets. Because of this situation, an exact I-frame bit-cost can be calculated. To calculate the I-frame bit-cost, all the required packets to transmit one GOP are depicted in FIG. 14. Table 21 indicates the occurrence of each packet type. The smallest period interval to record a 25 Hz frame rate corresponds to 18 revolutions. Within this period, 15 frames are stored, which is equal to 5 GOP's.

With aid of the GOP layout at transport stream level depicted in FIG. 14, the total amount of transport stream overhead can be calculated. In Table 21 the amount of transport stream overhead is depicted for the three frame rate situations. The characters a, b, c, d, e, f, g, h, i, j and k in Table 21 correspond to the characters used in FIG. 14.

TABLE 21

TRANSPORT STREAM OVERHEAD FOR THREE DIFFERENT RECORDING MODES

| | Amount of revolutions = 3 | | | | Amount of rev's = 18 | |
|---|---|---|---|---|---|---|
| | Scanner | | Scanner | | | |
| Packet Type | rate/ Frame rate 30 Hz | TS Overhead (byte) | Rate/Frame rate 30*1000/100 1 Hz | TS Overhead (byte) | Scanner rate = 30 Hz Frame rate = 25 Hz | Ts Overhead (byte) |
| a | 1 | 188 | 1 | 188 | 5 | 940 |
| b | 1 | 188 | 1 | 188 | 5 | 940 |
| c | 1 | 27 | 1 | 27 | 5 | 135 |
| d | 72 | 288 | 72 | 288 | 430 | 1720 |
| e | 1 | 12 | 1 | 12 | 5 | 60 |
| f | 71 | 284 | 71 | 284 | 435 | 1740 |
| g | 1 | 27 | 1 | 27 | 5 | 135 |
| h | 2 | 8 | 2 | 8 | 10 | 40 |
| i | 1 | 27 | 1 | 27 | 5 | 135 |
| j | 2 | 8 | 2 | 8 | 10 | 40 |
| k | 0 | — | 0 | — | 3 | 564 |

Table 21 indicates the division of the used transport stream packet types at the smallest periodic time interval. For the situation where the frame rate is equal to the scanner rate, a perfect fit of transport stream packets can be reached with respect to the periodicity. The situation whereby the frame rate does not fit exactly on the scanner rate, stuffing is performed to obtain periodicity. The reason for this lies in the fact that the GOP structure that builds the video elementary stream will be fit at a fixed amount of transport stream packets. The packets a, b, c, d, e, f, g, h, i and j from FIG. 14, form the basic GOP structure at transport stream level. Packet k is only available after every fifth basic GOP structure. With aid of the basic GOP structure at transport stream level, the available video elementary stream bandwidth can be calculated. In order to calculate the video elementary stream bandwidth, the transport stream overhead will be explored.

Next, the bandwidth of the video elementary stream will be discussed.

A transport stream consist of packets with a fixed packet length of 188 bytes. A distinction can be made between packets that contain video information, packets that contain video information and PES information, and packets that contain demultiplex information, Program Specific Information (PSI). The packets that are depicted in FIG. 14, contain either PSI or video information, or video- and PES information. A special packet is the null packet which is used for channel stuffing. The video elementary stream bandwidth can be calculated by extracting the non-video elementary stream bit-rate, from the available channel bit-rate. The non-video elementary stream is defined by the following packets and specific field:

The PAT packet

The PMT packet

The main ts header

The adaptation field

The PES header

The transport stream overhead is slightly lower than the 5% assumed earlier. Due to this, the I-frame bit-cost is slightly higher than the values from Table 9.

First, an embodiment with a 30 Hz scanner and 30 Hz frame rate will be discussed. The channel rate can be defined by multiplying the amount of transport stream packets that can be stored per revolution, which is 51, times the amount of revolutions per GOP period, which is three. This results in 153 transport stream packets per 3 revolutions. Subtracting all the non-elementary stream data from the 153 transport stream packets results in a video elementary stream bit-rate of 2131920 bits/s. With a GOP structure of IPP, whereby, the P-frame have a fixed bit-cost of 350 bytes, 30 slices times 11 bytes per slice plus 20 bytes for the picture header and picture header extension result in a I-frame bit-cost of 207592 bits per picture.

Next, an embodiment with a 29.97 Hz scanner and 29.97 Hz frame rate will be discussed. The bit-rate calculation is almost equal to that of the 30 Hz scanner and 30 Hz frame rate situation. The video elementary stream bit-rate is 2129790.209 bits/s. The I-frame bit-cost is not effected by 0.1% variation so with a GOP structure of IPP, whereby, the P-frame have a fixed bit-cost of 350 bytes, 30 slices times 11 bytes per slice plus 20 bytes for the picture header and picture header extension result in a I-frame bit-cost of 207592 bits per picture.

Finally, an embodiment with a 30 Hz scanner and 25 Hz frame rate is discussed. The calculation for this situation is slightly different from the previous two situations. Again, the channel rate can be defined by multiplying the amount of transport stream packets that can be stored per revolution, which is 51, times the amount of revolutions per GOP period, which is 18. This results in 918 transport stream packets per 18 revolutions. Subtracting all the non-elementary stream data from the 153 transport stream packets results in a video elementary stream bit-rate of 2198266.66 bits/s. With a GOP structure of IPP, whereby, the P-frame have a fixed bit-cost of 416 bytes, 36 slices times 11 bytes per slice plus 20 bytes for the picture header and picture header extension result in a I-frame bit-cost of 257136 bits per picture.

Next, the signal processing to generate a valid MPEG transport stream for recording that comprises a normal play transport stream component and a trick play transport stream component, will be described hereafter.

Figure 15:
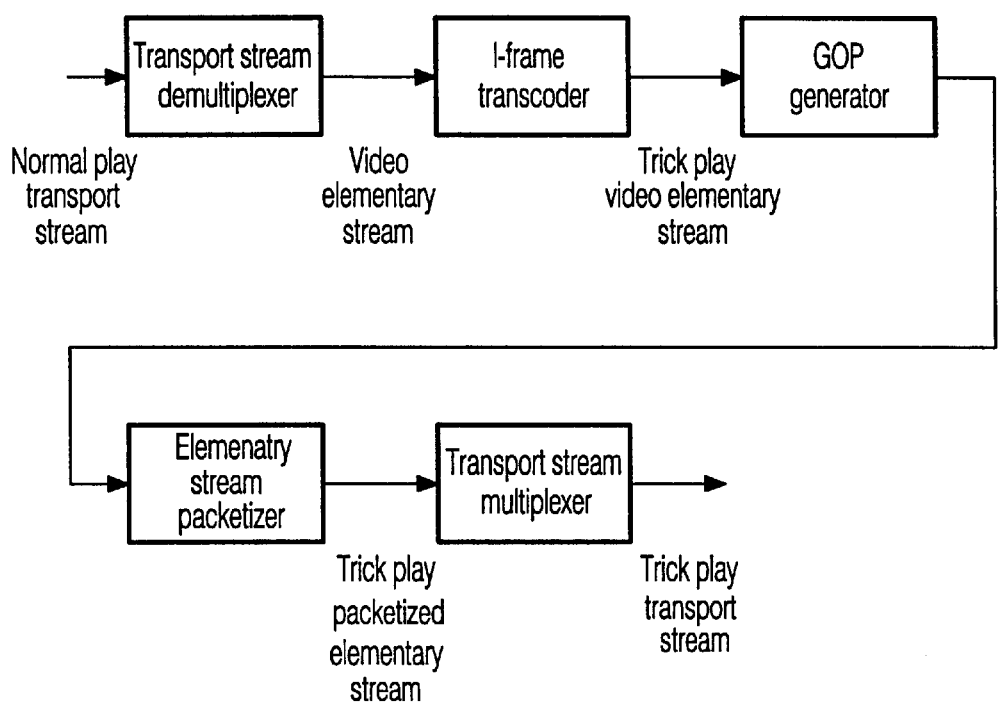
FIG. 15 shows a block diagram of the trick play signal processing.

A block diagram of the required signal processing blocks is depicted in FIG. 15. The first signal processing block in FIG. 15 is the transport stream demultiplexer. This block extracts the video elementary stream from the multiplexed transport stream. The information required to perform this operation is the video PID of the video elementary stream. This information can either be obtained by parsing the PSI or can be delivered by other parts of the recording system.

In case of PSI usage, special packets are parsed to obtain the required video PID. The first packet that is parsed is the PAT packet which has PID='0'. This packet contains the PMT PID. This PMT PID, which is a customer-defined value, carries the video PID which is also a customer-defined value. For detailed information, see FIG. 4 and ISO/IEC 13818-1. In case that there is only one program available, the generation of video trick play is unambiguous. When there are more programs, such as, e.g., multi camera, then an arrangement is required to define on which program trick play is performed. A possible solution may be that in case of multi-program, trick play is generated for the first- or the last program in the PAT table.

After extracting the video elementary stream from the multiplexed transport stream, I-frame extraction is carried out. A video decoder can only start decoding when a sequence header, in case of MPEG-1, or a sequence header and a sequence extension, in case of MPEG-2, is received. For this reason, the sequence header and sequence extension are stored in memory. For those situation where a new GOP is not succeeded by a sequence header and a sequence extension, the in-memory stored sequence header and sequence extension are inserted before sending the GOP header. The purpose of this insertion is to enable the video decoding process to start as quickly as possible after a switch from normal play to trick play. The stored sequence header and sequence extension header are updated each time a sequence header and sequence extension header is received. This is important because the quantizer field may have been changed. The other field in the sequence headers must remain the same value for the whole video sequence. The next header that should follow the sequence layer is the GOP header. All extensions start codes that follow the sequence extension are ignored. This is done because they are not required by the video decoding process and only consumes bits that are necessary for the transcoding process. After the GOP header, the picture header should be received. Extensions that follow this header beside the picture coding extension and the quant matrix extension will be ignored. Up to now, all the filtering can be done on a byte basis. So far the following headers are parsed and necessary for the transcoded I-frame.

Sequence header

Sequence extension

GOP header

Picture header

Picture coding extension

Quant matrix extension

After the quant matrix extension, if available, otherwise after the picture coding extension, the slices are received. These units contain the compressed video data. Slices can be detected by parsing the video elementary stream on a byte basis. From here on, variable length decoding will take place, and the transcoding process is performed.

When the selected I-frame is reduced, a valid elementary stream must be obtained. For this reason, so-called empty P-frames are added to the reduced I-frame in order to have the correct frame rate. The P-frame horizontal size depends on the horizontal size of the original I-frame size. The amount of variation is limited because the maximum horizontal size is maximal 720 pels in some MPEG applications. An empty P-frame must always contain the first and last macroblock of a slice, this is required by MPEG. The macroblocks that are in between the first and the last macroblock are skipped. This way, such frames are called empty P-frames.

Figure 16:
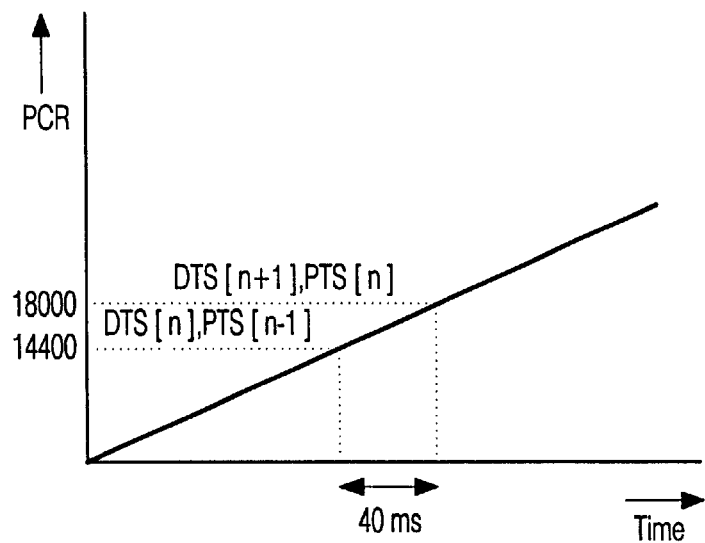
FIG. 16 shows the decoding and presentation time stamps for 25 Hz frame rate on the system time axis.

Before the video elementary stream is converted into transport stream packets with a length of 188 bytes, a Packet header is added to the individual pictures that build up the video elementary stream. The Packetized Elementary Stream (PES) consists of the individual pictures that build up the video elementary stream. The only difference is that a header is attached to each compressed picture which carries information, such as, Decoding Time Stamp (DTS), Presentation Time Stamp (PTS), DSM_trick_mode_flag, etc. For more details, see ISO/IEC 13818-1. The DTS controls the video decoding process and the PTS controls the video presentation process. These two time stamps form the second way to perform the decoding process. The first way is by using the VBV_delay that is available in the elementary stream picture header. The timebase, Program Clock Reference (PCR), which is used for the decoding process, is transmitted by the transport stream. The DTS and PTS are unique points on the PCR time axes. For an example, see FIG. 16

The generation of DTS and PTS can be done by just incrementing the DTS and PTS value by one frame period. The example given below described the calculation of this one frame period value.

EXAMPLE

Frame period=40 ms, (25 Hz frame rate)

System clock=27 MHz

Amount_of_27 MHz_cycles_per_frame_period=
(Frame period*System clock)

1080000=40e-3*27e6

The DTS and PTS have a resolution based on a 90 KHz clock. For this reason the Amount_of_27 MHz_cycles_per_frame_period must be divided by 300. This division results in a frame period value of 3600.

So, when three frame period are required to transmit one I-frame and two empty P-frames, then the initialization value for DTS and PTS becomes:

DTS=3*3600=10800

PTS=4*3600=14400

These values are depicted at a 33-bit wide field in the PES header.

The initialization value depends on the amount of time that is required to transmit the first picture to the decoder. This depends on the VBV_delay and the time consumed, extra delay, by the multiplex process.

The transport stream multiplex operation, multiplexes the packetized video elementary stream and the required Program Specific Information (PSI). For this purpose, the packetized video elementary stream is divided over K transport stream packets. Hereby, K is the number of packets required to transmit one packetized video elementary stream picture. With the aid of Table 21, the value of K can be calculated for the three supported recording situations.

The transport stream layer takes care of several system aspects. The following system aspects are minimally required to create a transport stream that can be decoded by a transport stream decoder:

Synchronizes the decoder timebase to the encoder timebase

Contains a mechanism to deal with corrupted data

Contains a mechanism to deal with timebase discontinuities

Indicate a random access points

Video trick play, regardless of the trick play speed, can be seen a video sequence, and normally with a finite duration. Such a video sequence has a timebase, the temporal direction on which, at regular time intervals, usually the frame period, pictures are decoded and presented at a display, see FIG. 16. The timebase at the decoder side must be locked to that of the encoder in order to prevent a drift of the audio-visual information. For video trick play, there can only occur a drift in the video decoding and presentation process. To lock the decoder timebase to that of the encoder timebase, a Program Clock Reference (PCR) is send to the decoder at regular time intervals. MPEG, as well as DVB, have put constraints on this parameter. Table 22 below contains the recommended refresh values for several transport stream parameters.

TABLE 22

PACKET DISTANCE FOR PAT, PMT AND PCR PACKETS

| Parameter name | According to ETS 290 | |
| --- | --- | --- |
|  | Min | Max |
| PAT | 25 ms | 0.5 s |
| PMT | 25 ms | 0.5 s |
| PCR | 0 ms | 0.04 s |

Transport stream packets that are corrupted due to transmission errors can disturb the decoding process. They can, e.g., cause a pipeline error in the video elementary stream decoder. For the D-VHS system, an error correction system is available that is capable of correcting most of the errors that occur during the read process. Packets that are corrupted and cannot be corrected by the error correction system, can either be flagged by means of a transport_error_indicator, or can be removed from the multiplex. A transport stream decoder can disregard packets in which a transport_error_indicator flag is active, this will increase the robustness of the decoder system. The missing video data is replaced by video data from the previous decoded picture. This process is known as concealment.

In situations where there is a switch between normal play and trick play, the timebase will make a jump. A transport stream decoder will react on such a jump by modifying its system clock caused by the PCR value of the new transport stream. This will lead to undefined situations in the transport stream decoder. It requires a certain time before the decoder will recover from this timebase discontinuity and start working properly again. This recovery must be initiated by the decoder. This means that the decoder has to monitor its behavior to detect such situations. In order to prevent this discontinuity, a discontinuity flag can be made active each time a switch is made between normal play and trick play or trick play and normal play. Beside activating the discontinuity flag, the data that refer to the previous timebase must not arrive at the input of the decoder, and the first new data that should arrive at the decoders input must contain a random_access_indicator, for detailed information, see ISO/IEC 13818-1.

Figure 17:
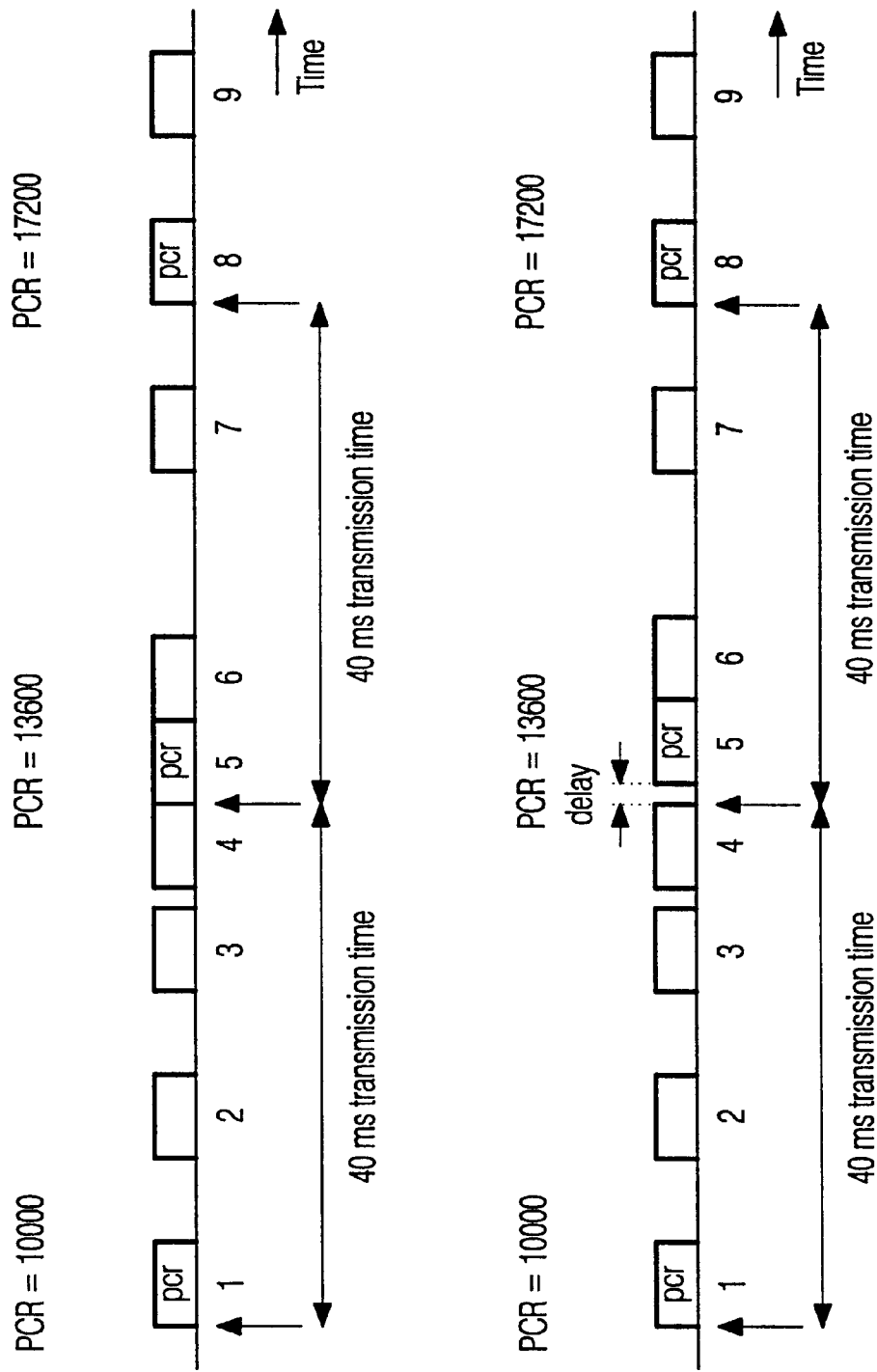
FIG. 17 shows a transport stream without jitter on a PCR packet.

The transport stream will be transported across a medium (e.g., a record carrier). The delay of this medium must be equal for each transport stream packet. If this is not the case, then it is possible to corrupt the decoding timebase. This is caused by the fact that some transport stream packets which contain the PCR value will take more time to arrive at the transport stream decoder input. The time sample taken at the encoder side, the PCR value, will be used in the decoder to synchronize the local decoder timebase. An extra transmission delay will cause jitter on the 27 MHz decoder clock. The maximum jitter that is allowed is defined by the ISO/IEC 13838-1, 2.4.2.1. FIGS. 17a and 17b indicate this process.

The distance in time between two succeeding transport stream packets that contain a PCR value, should be fixed. This means that the time which can be calculated with aid of the PCR value in the two PCR packets, and the time elapsed by the transmission should be equal. For the situation as depicted in FIG. 17a, the elapsed time should be 40 ms. The situation in FIG. 17b can cause problems if the time is large enough and falls outside the allowed jitter range.

A storage device can also be treated as a transmission channel. If only a recording is performed, then the delay is infinite. This will normally not be the case. At playback, the timing between succeeding transport stream packets must be in such a way reconstructed that it becomes equal to the timing between succeeding transport stream packets as they arrived at the input of the storage device during record. For this purpose, a process called time stamping is performed.

Figure 18:
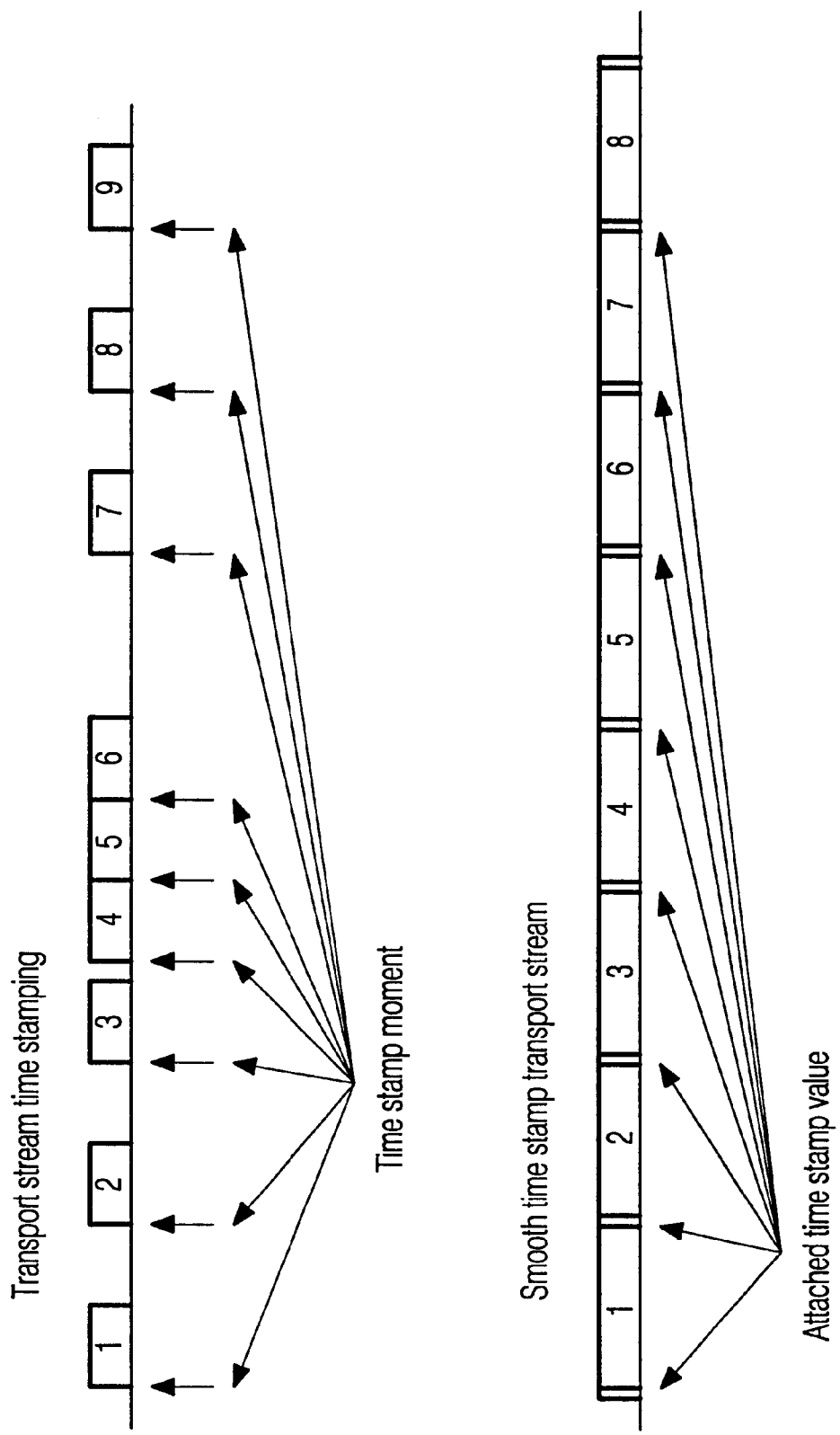
FIG. 18 shows the manipulation of distance of succeeding transport stream packets.

Normal play time stamping in D-VHS, is a mechanism that attaches a time label based on the 27 MHz clock which is locked to the incoming transport stream, to each incoming transport stream packet. The time label is referenced to the time duration of one revolution, in case of trick play, or three revolutions, in case of normal play, of the drum. During playback, the timing between succeeding transport stream packets can be reconstructed with aid of this time label. Once a time label is attached to a transport stream packet, this packet can be manipulated in various ways. One important aspect of this manipulation is that the position, of a transport stream packet may be changed. FIG. 18 indicates this manipulation. Changing the position does not mean the order in which should arrive at the decoder input. A manipulation, such as depicted in FIG. 18, occurs, for example, when the incoming transport stream has temporarily a higher bit-rate than the D-VHS channel bit-rate. Packets will be smoothed in time in order to store them on tape. Another situation occurs when trick play is added to the tape format. When there is no trick play, the normal play transport stream packets will be stored on a position within the tracks corresponding to the calculated position. This calculation is done with aid of the attached time stamp, see D-VHS system standard paragraph 2.4.2.1 and 2.4.3 for details. When this calculated position is not free, e.g., when it is occupied by trick play data, then the normal play transport stream packet is shifted to the first free syncblock area.

Due to the attached time stamp value, the original timing of the transport stream can be obtained during playback.

For trick play, there is also a time stamp mechanism. The mechanism works exactly the same as in normal play. Reference is made in this respect to earlier filed International Patent Application IB98/00131 (PHN 16614) for details. The difference between the trick play transport stream and the normal play transport stream is that the normal play stream can be a fixed bit-rate stream and that the trick play stream is a fixed bit-rate stream, when generated in the way described above. A fixed bit-rate is defined as a transport stream whereby the transport stream packets have a equidistant spacing on the time axis. In a variable bit-rate transport stream, succeeding transport stream do not have a equidistant spacing on the time axis. Because there are 51 transport stream packets read during one revolution of the scanner during trick play, time stamping becomes a simple process. For the software-generated trick play transport stream, which is not a real-time process, time stamps can be calculated by means of linear interpolation. The PCR values in the transport stream, which contain samples of the real-time 27 MHz encoder clock, can be used to generate the time stamps required for trick play transport stream recording. Linear interpolation not only delivers the exact time stamp values for those transport stream packets that contain the PCR fields, but also for the transport stream-packets that lay in between the two PCR packets. This last phenomenon is caused by the fact that the transport stream has a fixed bit-rate, whereby the transport stream packets have an equidistant spacing.

The following can be concluded. Low-end video trick play based on the track select system has the potential of providing a subjective video quality that can be ranked from acceptable up to good. The trick play signal processing algorithm is a transcoding algorithm, based on selecting runlength-level-encoded AC coefficients from selected normal play intraframe MPEG-encoded pictures. To suppress the amount of clearly visible artefacts, that occur when only a small number of AC coefficient per DCT block are selected, the AC coefficient selection process depends on the value of the differential DC of that DCT block. This method will reduce the amount of visible artefacts that occur at edges.

Although the amount of intraframe-encoded pictures that can be transmitted to the receiver side is smaller than the supported frame rate, a normal transport stream decoder can be used to display the decoded video trick play stream. A key factor hereby is the so-called empty P-frame. With aid of such a picture, a valid MPEG video elementary stream (valid, with respect to the frame rate) can be generated. This is important because all the provisions that are available to take over the video decoder control are a manufacturer's option. This means that there is no guarantee that a decoder control can be realized. Trick play based on repetition of intraframe pictures may lead to interlace disturbance. Such a situation will occur when the original video was not progressively scanned. With the aid of flags in the transport stream layer, the video decoder can be forced into field repeat mode. But again, this is a manufacturer's option. Trick play, based on I-frame selection, offers the advantage that the generated video trick play stream can be used for reverse trick play as well due to the fact that, beside the interlace information, there is no temporal information in the video information. By means of temporal sub-sampling in the MPEG-compressed domain, high video trick play stream can be generated. Due to the re-usability of transcoded video trick play data, there will only be one video transcoder to generate all the required video elementary trick play streams.

Normal play channel stuffing is based on insertion of dummy syncblocks. Trick play channel stuffing based on syncblock stuffing makes trick play generation for reverse speeds unnecessarily complex. For this reason, trick play channel stuffing based on dummy syncblocks has been abandoned and transport stream stuffing is introduced. Although transport stream stuffing requires two syncblocks, the trick play system complexity is reduced considerably. Due to the fact that two of the three supported frame rates can be mapped at the scanner rate, channel stuffing only occurs for the 25 Hz frame rate.

Due to a fixed trick play transport stream mapping, time stamping becomes a signal processing step with less complexity.

Figure 19:
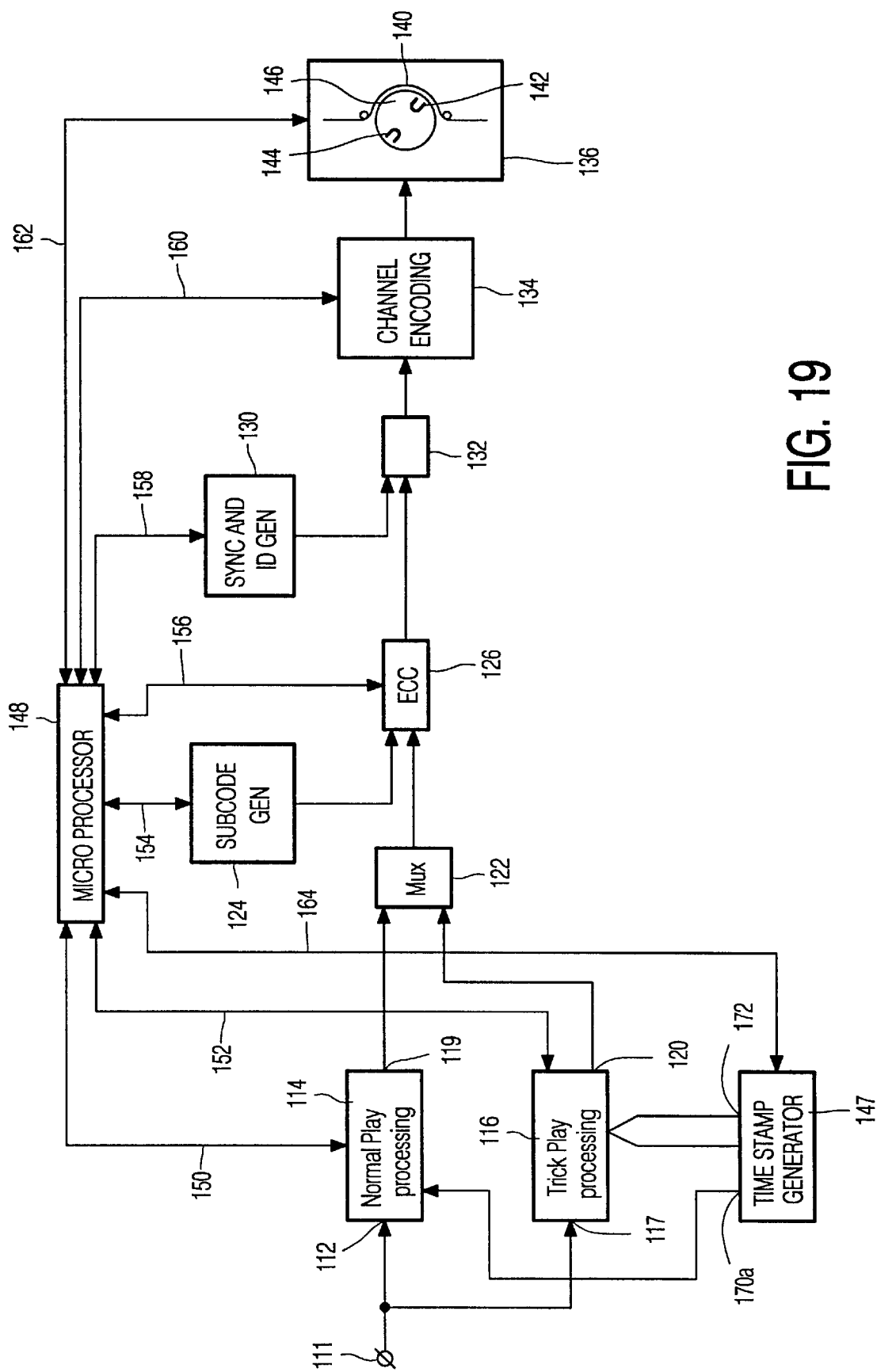
FIG. 19 shows the recording apparatus in accordance with the invention.

Next, an apparatus of the helical scan type, for recording the trick play information on a longitudinal record carrier, is described. FIG. 19 shows the recording apparatus which comprises an input terminal 111 for receiving a video signal and a corresponding audio signal. The video signal and the corresponding audio signal may have been encoded into transport packets included in an MPEG serial datastream, well known in the art. The input terminal 111 is coupled to an input 112 of a 'normal play' processing unit 114. Further, a 'trick play' processing unit 116 is provided having an input 117 also coupled to the input terminal 111. Outputs 119 and 120 of the 'normal play' processing unit 114 and the 'trick play' processing unit 116 are coupled to corresponding inputs of a multiplexer 122. The 'normal play' information as well as the 'trick play' information will be recorded in the tracks on the record carrier 140.

For a further description of the 'normal play' processing unit 114 and the 'trick play' processing unit 116, reference is made to European Patent Application EP-A 702,877, corresponding to U.S. Pat. No. 5,579,183 (PHN 14.818).

A sub-code signal generator 124 is present for supplying the sub-code signal information for storage in a sub-code signal recording portion in the tracks on the record carrier. Outputs of the multiplexer 122 and the generator 124 are coupled to corresponding inputs of an error correction encoder unit 126. The error correction encoder unit 126 is capable of carrying out a error correction encoding step on the 'normal play' (video and audio) information and the trick play information, so as to obtain the parity information.

The recording apparatus further comprises a generator 130 for adding sync and ID information. After combination of the signals in the combining unit 132, the combined signal is applied to a unit 134, in which a channel encoding is carried out on the composite signal. The channel encoding carried out in the encoding unit 134 is well known in the art. For an example of such channel coding, reference is made in this respect to U.S. Pat. No. 5,142,421 (PHN 13.537).

An output of the channel encoding unit 134 is coupled to an input of a writing unit 136, in which the datastream obtained with the encoding unit 134 is recorded in the slant tracks on a record carrier 140, by means of at least two write heads 142 and 144 positioned on a rotating head drum 146. The write heads 142 and 144 have head gaps with mutually different azimuth angles. Further, a time stamp generator 147 is available for generating the time stamps for the normal play processing unit 114 and the trick play processing unit 116.

A microprocessor unit 148 is present for controlling the functioning of the various blocks, such as:
  the control of the normal play signal processing block 114 via the control connection 150,
  the control of the trick play signal processing block 116 via the control connection 152,
  the control of the subcode signal generator block 124 via the control connection 154,
  the control of the error correction encoding block 126 via the control connection 156,
  the control of the sync signal and ID signal generator block 130 via the control connection 158,
  the control of the channel encoding block 134 via the control connection 160,
  the control of the transport velocity of the record carrier 140 and the rotation of the head drum 146, via the control connection 162, and
  the control of the time stamp generator 147 via the control connection 164.

The trick play processing 116 is adapted to retrieve I-frame information from the first information signal, in the way described above. The trick play signal obtained for a specific trick play speed is accommodated in trick play sync blocks, for recording on the record carrier.

Further, for each trick play information signal, trick play sync blocks are generated, in the sense that for each trick play sync block, a trick play speed identifier and a direction identifier are generated and stored in the trick play sync block and a time stamp is added to each packet in the various trick play information signals.

Next, the trick play sync blocks and the 'normal play' sync blocks, generated by the normal play signal processing unit 114, are combined in the multiplexer unit 122. Sub-code data is added and an error correction encoding is carried out on the combined normal play data and trick play data so as to obtain the parity information. Further, sync words and identification information is added. Next, a channel encoding step is carried out on the information prior to recording the information in the tracks.

While the invention has been described with reference to preferred embodiments thereof, it is to be understood that these are not limitative examples. Thus, various modifications may become apparent to those skilled in the art, without departing from the scope of the invention, as defined by the claims.

Further, the invention lies in each and every novel feature or combination of features.

What is claimed is:

1. An apparatus for recording a digital video information signal on a record carrier, the apparatus comprising:
  input means for receiving the digital video information signal;
  trick play signal generating means for generating a trick play signal and a second trick play signal from said digital video information signal, said trick play signal enabling a trick play reproduction at a speed m times a nominal reproduction speed, where m is an integer larger than 1, and said second trick play signal enabling a trick play reproduction at a speed p*m times said nominal reproduction speed, where p is a constant larger than 1, said second trick play signal being formed from said digital video information signal by selecting each p-th group of pictures from the trick play signal;
  merging means for merging said digital video information signal and said trick play signal and said second trick play signal into a composite information signal; and
  writing means for writing said composite information signal in a track on said record carrier, wherein said trick play signal generating means comprises:
    (a) means for retrieving intra-encoded pictures from said digital video information signal;
    (b) means for generating inter-encoded pictures; and
    (c) means for merging said intra-encoded pictures and said inter-encoded pictures to form said trick play signal comprising subsequent groups of pictures, said trick play signal comprising said intra-encoded picture, followed by a number n of said generated inter-encoded pictures, where n is an integer larger than 0, the generated inter-encoded pictures being such that, upon reproduction at said trick play speed, an inter-encoded picture follows an intra-encoded picture, upon decoding, in a repeated presentation of a picture obtained from decoding said intra-encoded picture.

2. The apparatus as claimed in claim 1, wherein an inter-encoded picture in said group of pictures has been obtained by an encoding step which is equivalent to encoding a picture which is a copy of the previous picture in the said group of pictures that led to the intra-encoded picture in said group of pictures.

3. The apparatus as claimed in claim 1, wherein the apparatus is further adapted to record a third trick play signal on said record carrier, said third trick play signal being meant for a reproduction from said record carrier at a third trick play speed p*m*q times said nominal reproduction speed, q being a constant larger than 1, said trick play signal generating means further comprising means for generating said third trick play signal from said video information signal by selecting each q-th group of pictures from the second trick play signal, said merging means further merging said third trick play signal into said composite signal.

4. The apparatus as claimed in claim 1, wherein the apparatus is further adapted to record a second trick play signal on said record carrier, said second trick play signal being meant for a reproduction from said record carrier at a second trick play speed—m times said nominal reproduction speed, said trick play signal generating means further comprising means for generating said second trick play signal from said video information signal by reversing the sequence of pictures in each group of pictures in the trick play signal, said merging means further merging said second trick play signal into said composite signal.

5. The apparatus as claimed in claim 1, wherein the trick play signal generating means comprises:
   (a) means for retrieving I-pictures from said digital video information signal;
   (b) means for generating P-pictures; and
   (c) means for merging said I-pictures and said P-pictures to form said trick play signal comprising groups of pictures, comprising an I-picture followed by a number n of P-pictures, the generated P-pictures being such that, upon reproduction at said trick play speed, a P-picture is followed by an I-picture, upon decoding, in a repeated presentation of a picture obtained from decoding said I-picture.

6. An apparatus for recording a digital video information signal on a record carrier, the apparatus comprising:
   input means for receiving the digital video information signal;
   trick play signal generating means for generating a trick play signal from said digital video information signal, said trick play signal enabling a trick play reproduction at a speed m times a nominal reproduction speed, where m is an integer larger than 1;
   merging means for merging said digital video information signal and said trick play signal into a composite information signal; and
   writing means for writing said composite information signal in a track on said record carrier,
wherein said trick play signal generating means comprises:
   (a) means for retrieving intra-encoded pictures from said digital video information signal;
   (b) means for generating inter-encoded pictures; and
   (c) means for merging said intra-encoded pictures and said inter-encoded pictures to form said trick play signal comprising subsequent groups of pictures, said trick play signal comprising said intra-encoded picture, followed by a number n of said generated inter-encoded pictures, where n is an integer larger than 0, the generated inter-encoded pictures being such that, upon reproduction at said trick play speed, an inter-encoded picture follows an intra-encoded picture, upon decoding, in a repeated presentation of a picture obtained from decoding said intra-encoded picture,
wherein said trick play signal generating means generates said groups of pictures in said trick play signal such that all of said groups of pictures have a constant bit-cost.

7. An apparatus for recording a digital video information signal on a record carrier, the apparatus comprising:
   input means for receiving the digital video information signal;
   trick play signal generating means for generating a trick play signal from said digital video information signal, said trick play signal enabling a trick play reproduction at a speed m times a nominal reproduction speed, where m is an integer larger than 1;
   merging means for merging said digital video information signal and said trick play signal into a composite information signal; and
   writing means for writing said composite information signal in a track on said record carrier,
wherein said trick play signal generating means comprises:
   (a) means for retrieving intra-encoded pictures from said digital video information signal;
   (b) means for generating inter-encoded pictures; and
   (c) means for merging said intra-encoded pictures and said inter-encoded pictures to form said trick play signal comprising subsequent groups of pictures, said trick play signal comprising said intra-encoded picture, followed by a number n of said generated inter-encoded pictures, where n is an integer larger than 0, the generated inter-encoded pictures being such that, upon reproduction at said trick play speed, an inter-encoded picture follows an intra-encoded picture, upon decoding, in a repeated presentation of a picture obtained from decoding said intra-encoded picture,
wherein said intra-coded pictures in said trick play signal are data compressed versions of intra-encoded pictures comprised in said digital video information signal, and wherein the trick play signal generating means comprises:
   means for data compressing intra-encoded pictures comprised in said digital video information signal by selecting a restricted number of AC coefficients of said intra-encoded pictures to form said intra-encoded pictures of said trick play signal;
   means for selecting a number of AC coefficients that may be variable for subsequent intra-encoded pictures of said trick play signal; and
   means for selecting, for the generation of an intra-encoded picture of said trick play signal, for a current sub-picture of said intra-encoded picture, a number of AC coefficients from the corresponding sub-picture of said intra-encoded picture of said digital video information signal, said number having a relationship with the difference between the DC coefficient of the current sub-picture of said intra-encoded picture of said digital information signal from which the present intra-encoded picture of the trick play signal will be derived and the DC coefficient of the previous sub-picture of said intra-encoded picture of said digital video information signal.

8. The apparatus as claimed in claim 7, wherein said number of AC coefficients increases for an increasing difference.

9. An apparatus for recording a digital video information signal on a record carrier, the apparatus comprising:
   input means for receiving the digital video information signal;
   trick play signal generating means for generating a trick play signal from said digital video information signal, said trick play signal enabling a trick play reproduction at a speed m times the nominal reproduction speed, where m is an integer larger than 1;

merging means for merging said digital video information signal and said trick play signal into a composite information signal; and writing means for writing said composite information signal in a track on said record carrier, wherein said trick play signal generating means comprises means for retrieving intra-encoded pictures from said digital video information signal, and means for data compressing said retrieved intra-encoded pictures to form data compressed intra-encoded pictures in said trick play signal, wherein said data compressing means data compresses intra-encoded pictures comprised in said digital video information signal by selecting a restricted number of AC coefficients of said intra-encoded pictures to form said data compressed intra-encoded pictures of said trick play signal, and wherein the trick play signal generating means further comprises:

means for selecting a number of AC coefficients that may be variable for subsequent data compressed intra-encoded pictures of said trick play signal; and means for selecting, for the generation of a data compressed intra-encoded picture of said trick play signal, for a current sub-picture of said data compressed intra-encoded picture, a number of AC coefficients from the corresponding sub-picture of said intra-encoded picture of said digital video information signal, said number having a relationship with the difference between the DC coefficient of the current sub-picture of said intra-encoded picture of said digital information signal from which the present data compressed intra-encoded picture of the trick play signal will be derived and the DC coefficient of the previous sub-picture of said intra-encoded picture of said digital video information signal.

10. The apparatus as claimed in claim 9, wherein said number of AC coefficients increases for an increasing difference.

11. A method of recording a digital video information signal on a record carrier, the method comprising the steps:

receiving the digital video information signal;

generating a trick play signal from said digital video information signal, said trick play signal enabling a trick play reproduction at a speed m times the nominal reproduction speed, where m is an integer larger than 1;

generating a second trick play signal from said digital video information signal, said second trick play signal enabling a trick play reproduction at a speed p*m times said nominal reproduction speed, where p is a constant larger than 1, said second trick play signal being formed from said digital video information signal by selecting each p-th group of pictures from the trick play signal;

merging said digital video information signal, said trick play signal and said second trick play signal into a composite information signal; and writing said composite information signal in a track on said record carrier, wherein said trick play signal generating step comprising the substeps:

(a) retrieving intra-encoded pictures from said digital video information signal;

(b) generating inter-encoded pictures; and (c) merging said intra-encoded pictures and said inter-encoded pictures to form a trick play signal comprising subsequent groups of pictures, comprising an intra-encoded picture, followed by a number n of said generated inter-encoded pictures, where n is an integer larger than 0, the generated inter-encoded pictures being such that, upon reproduction at said trick play speed, an inter-encoded picture follows an intra-encoded picture, upon decoding, in a repeated presentation of a picture obtained from decoding said intra-encoded picture.

12. A method of recording a digital video information signal on a record carrier, the method comprising the steps of:

receiving the digital video information signal;

generating a trick play signal from said digital video information signal, said trick play signal enabling a trick play reproduction at a speed m times a nominal reproduction speed, where m is an integer larger than 1;

merging said digital video information signal and said trick play signal into a composite information signal; and writing said composite information signal in a track on said record carrier, wherein said trick play signal generating step comprises the substeps:

(a) retrieving intra-encoded pictures from said digital video information signal;

(b) generating inter-encoded pictures; and (c) merging said intra-encoded pictures and said inter-encoded pictures to form said trick play signal comprising subsequent groups of pictures, said trick play signal comprising said intra-encoded picture, followed by a number n of said generated inter-encoded pictures, where n is an integer larger than 0, the generated inter-encoded pictures being such that, upon reproduction at said trick play speed, an inter-encoded picture follows an intra-encoded picture, upon decoding, in a repeated presentation of a picture obtained from decoding said intra-encoded picture, wherein said intra-encoded pictures in said trick play signal are data compressed versions of intra-encoded pictures comprised in said digital video information signal, and wherein said trick play signal generating step further comprises the substeps:

data compressing said retrieved intra-encoded pictures in said digital video information signal by selecting a restricted number of AC coefficients of said intra-encoded pictures to form data compressed intra-encoded pictures in said trick play signal;

selecting a number of AC coefficients that may be variable for subsequent intra-encoded pictures of said trick play signal; and selecting, for the generation of an intra-encoded picture of said trick play signal, for a current sub-picture of said intra-encoded picture, a number of AC coefficients from the corresponding sub-picture of said intra-encoded picture of said digital video information signal, said number having a relationship with the difference between the DC coefficient of the current sub-picture of said intra-encoded picture of said digital video information signal from which the present intra-encoded picture of the trick play signal will be derived, and the DC coefficient of the previous sub-picture of said intra-encoded picture of said digital video information signal.

13. A record carrier having a digital video information signal, a trick play signal and a second trick play signal recorded thereon, said digital video information signal being meant for reproduction from said record carrier at a nominal play reproduction speed, said trick play signal being meant for reproduction from said record carrier at a trick play speed m times said nominal reproduction speed, m being an integer larger than 1, and said second trick play signal being meant for reproduction from said record carrier at a trick play speed p*m times said nominal reproduction speed, where p is a constant larger than 1, said trick play signal comprising subsequent groups of pictures, comprising an intra-encoded picture, followed by a number n of inter-encoded pictures, where n is an integer larger than 0, the inter-encoded pictures being such that, upon reproduction at said trick play speed, an inter-encoded picture follows an intra-encoded picture, upon decoding, in a repeated presentation of a picture obtained from decoding said intra-encoded picture, and said second trick play signal being formed from said digital video information signal by selecting each p-th group of pictures from the trick play signal.

* * * * *